(12) United States Patent
Newbury

(10) Patent No.: US 12,529,849 B2
(45) Date of Patent: Jan. 20, 2026

(54) FIBER OPTIC CONNECTOR

(71) Applicant: SENKO Advanced Components, Inc., Hudson, MA (US)

(72) Inventor: Paul Newbury, Ashland, MA (US)

(73) Assignee: Senko Advanced Components, Inc., Hudson, MA (US)

( * ) Notice: Subject to any disclaimer, the term of this patent is extended or adjusted under 35 U.S.C. 154(b) by 304 days.

(21) Appl. No.: 18/047,012

(22) Filed: Oct. 17, 2022

(65) Prior Publication Data

US 2023/0123261 A1   Apr. 20, 2023

Related U.S. Application Data

(60) Provisional application No. 63/256,604, filed on Oct. 17, 2021.

(51) Int. Cl.
*G02B 6/38* (2006.01)

(52) U.S. Cl.
CPC ......... *G02B 6/3869* (2013.01); *G02B 6/3887* (2013.01)

(58) Field of Classification Search
CPC ............................ G02B 6/4471; G02B 6/3887
See application file for complete search history.

(56) References Cited

U.S. PATENT DOCUMENTS

| | | | |
|---|---|---|---|
| 5,212,752 A | 5/1993 | Stephenson et al. | |
| 5,428,703 A | 6/1995 | Lee | |
| 5,682,451 A | 10/1997 | Lee et al. | |
| 7,712,971 B2 | 5/2010 | Lee et al. | |
| 8,132,970 B2 * | 3/2012 | Hsu | G02B 6/3833 385/84 |
| 8,974,124 B2 | 3/2015 | Chang | |
| 9,081,154 B2 | 7/2015 | Zimmel et al. | |
| 9,297,964 B2 | 3/2016 | Chang et al. | |
| 9,459,411 B2 | 10/2016 | Smith et al. | |
| 10,852,487 B1 * | 12/2020 | Ignatius | G02B 6/3879 |
| 2007/0160327 A1 * | 7/2007 | Lewallen | G02B 6/3817 385/53 |

(Continued)

FOREIGN PATENT DOCUMENTS

| | | | | |
|---|---|---|---|---|
| CN | 102334056 A | * | 1/2012 | ........... G02B 6/3616 |
| WO | WO-2022246255 A1 | * | 11/2022 | ........... G02B 6/3821 |

OTHER PUBLICATIONS

International Searching Authority, International Search Report and Written Opinion, dated Jan. 17, 2023, International Application No. PCT/US22/78198, 7 pages.

*Primary Examiner* — Thomas A Hollweg
*Assistant Examiner* — Marc E Manheim

(57) ABSTRACT

A fiber optic connector for terminating a drop cable comprises a housing having a front end portion and a rear end portion spaced apart along a longitudinal axis of the fiber optic connector; an inner connector configured to be received in the housing; a cable clamp insert configured to clamp onto the drop cable and be received in the housing, the cable clamp insert extending along the longitudinal axis; and a cable clamp retainer configured to couple to the rear end portion of the housing whereby the cable clamp retainer pushes the cable clamp insert forward in the housing. The cable clamp retainer is configured to apply an increasing force to create a tight connection between the housing and the cable clamp insert.

11 Claims, 51 Drawing Sheets

(56) References Cited

U.S. PATENT DOCUMENTS

| | | | |
|---|---|---|---|
| 2009/0148104 A1* | 6/2009 | Lu | G02B 6/3877 |
| | | | 385/72 |
| 2016/0187590 A1* | 6/2016 | Lu | G02B 6/3894 |
| | | | 385/78 |
| 2017/0261699 A1* | 9/2017 | Compton | G02B 6/3821 |
| 2020/0225423 A1 | 7/2020 | Li | |
| 2020/0400897 A1 | 12/2020 | Hu et al. | |
| 2021/0132300 A1* | 5/2021 | Isenhour | G02B 6/3875 |

\* cited by examiner ial cross section of the fiber
FIBER OPTIC CONNECTOR

CROSS-REFERENCE TO RELATED APPLICATION

This application claims priority to U.S. Provisional Patent Application No. 63/256,604, which is hereby incorporated by reference in its entirety.

FIELD

This disclosure generally pertains to a fiber optic connector, and more cl BACKGROUND The prevalence of the Internet has led to unprecedented growth in communication networks. Consumer demand for service and increased competition has driven network providers to continuously search for ways to improve quality of service while reducing cost. Optical communications systems are preferred for some applications because of their bandwidth and reliability. In certain environments, there is a need for more robust optical interconnect components. For example, the inventors have recognized a need for optical fiber connectors that terminate fiber optic drop cables in such a way as to limit transfer of forces imparted on the cable to sensitive internal components like the fiber optic ferrule.

SUMMARY

In one aspect, a fiber optic connector for terminating a drop cable comprises a housing including a back post. The housing is configured for the drop cable to enter the housing through the back post. A cable clamp insert is configured to be at least partially received in the back post. The cable clamp insert defines a passage for receiving the drop cable. A crimp ring is configured to be crimped onto the back post whereby the crimp ring secures the cable clamp insert to the housing and clamps the cable clamp insert onto the drop cable.

In another aspect, a fiber optic connector for terminating a drop cable comprises a housing having a front end portion and a rear end portion spaced apart along a longitudinal axis of the fiber optic connector. A connector is configured to be received in the housing. A cable clamp insert is configured to clamp onto the drop cable and be received in the housing. The cable clamp insert extends along the longitudinal axis. A cable clamp retainer is configured to couple to the rear end portion of the housing whereby the cable clamp retainer pushes the cable clamp insert forward in the housing. The cable clamp retainer is configured to apply an increasing force to create a tight connection between the housing and the cable clamp insert.

Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

Figure 1:
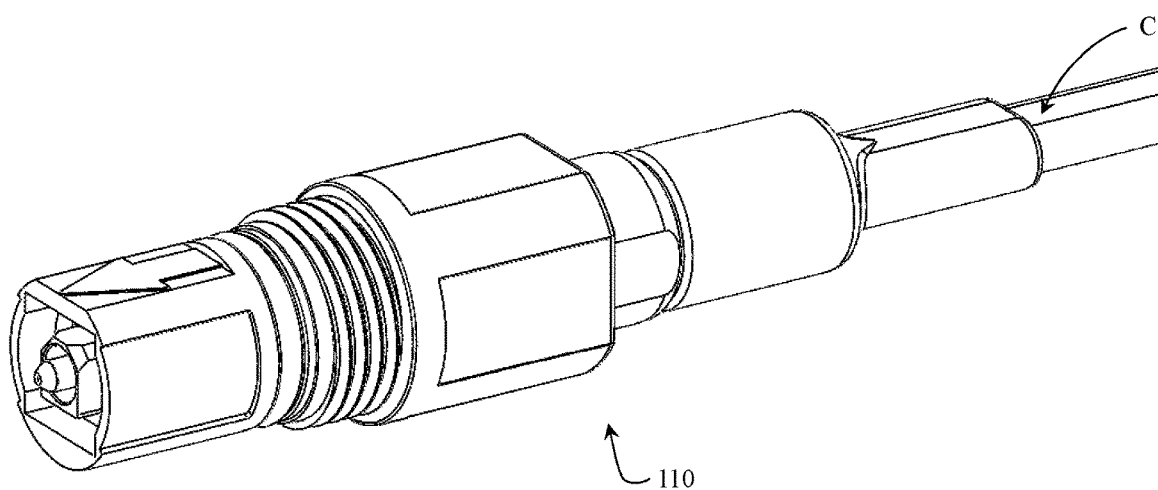
FIG. 1 is a perspective of a fiber optic connector terminating a first type of drop cable.
Figure 2:
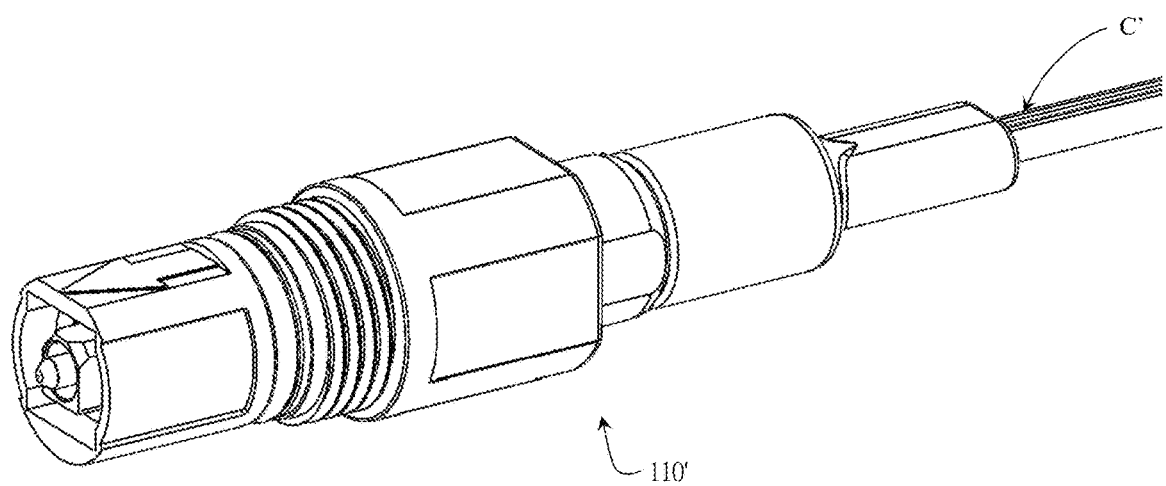
FIG. 2 is a perspective of a fiber optic connector terminating a second type of drop cable.

Referring to FIGS. 1 and 2, two exemplary embodiments of optical fiber connectors in the scope of the present disclosure are respectively generally indicated at reference numbers 110 and 110'. The connector 110 terminates an 8×4 drop cable C, and the connector 110' terminates a mini drop cable C'. Accordingly, this disclosure generally pertains to optical fiber connectors for terminating drop cables. The principles of this disclosure can be adapted for use with any type of drop cable without departing from the scope of the disclosure. The following detailed description focuses on connector 110, but it is to be understood that the connector 110' has the same general capabilities and construction, with internal features appropriately sized and shaped for the drop cable C'.

Figure 3:
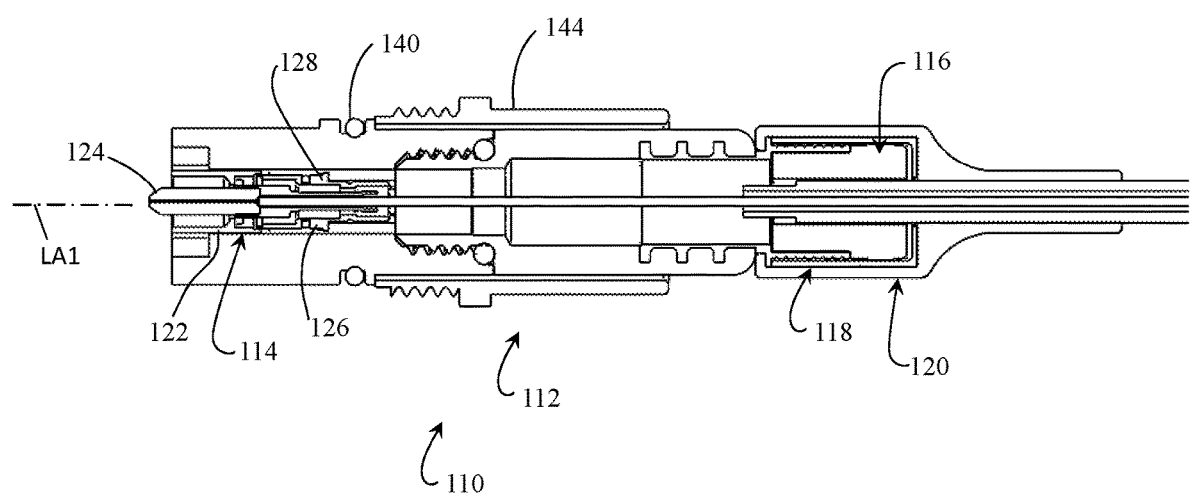
FIG. 3 is a longitudinal cross section of the fiber optic connector of FIG. 1.
Figure 4:
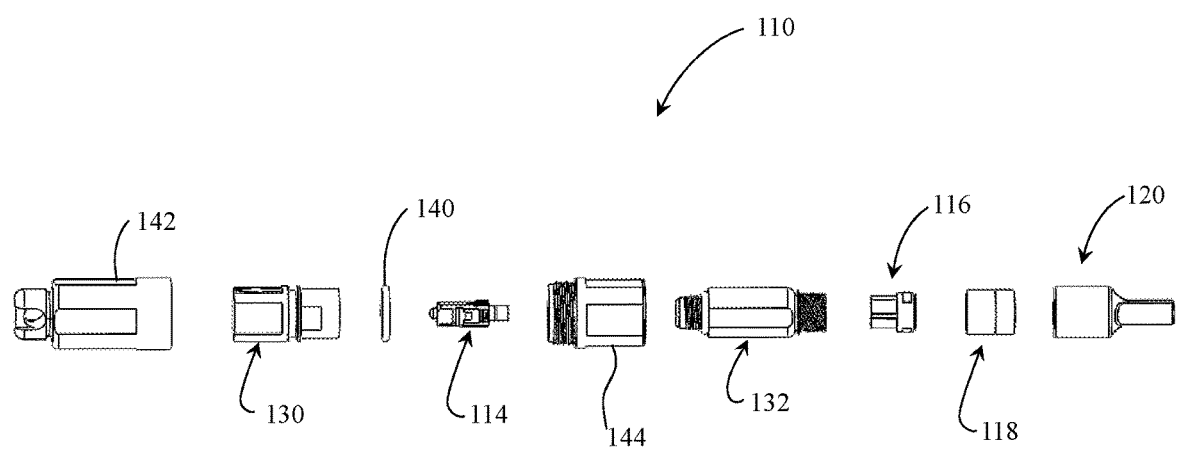
FIG. 4 is an exploded elevation of the fiber optic connector of FIG. 1.

Referring to FIGS. 3 and 4, the connector 110 broadly comprises an outer housing 112, an inner connector 114, a cable clamp insert 116, a crimp ring 118, and a heat shrink tube 120. The outer housing 112 is preferably a hardened, ingress-protected connector housing that is configured to hold and protect inner connector 114 of a standard, non-ingress-protected type. Those skilled in the art will recognize that the illustrated outer housing 112 is compatible with Optitap-type connection systems. In the illustrated embodiment, the inner connector 114 is an SC connector comprising an SC plug frame 122, a spring-loaded SC ferrule 124, a crimp post 126, and a crimp ring 128. But it will be understood that drop cable connectors utilizing other types of standard, non-ingress protected inner connectors can also be used without departing from the scope of the disclosure.

The outer housing 112 comprises a front body 130 and a back body 132 configured to couple to the front body. Suitably, the outer housing 112 further comprises a coupling element 144 configured to couple the connector to a mating receptacle. In the illustrated embodiment, the coupling element 144 is an externally threaded coupling nut for use with Optitap-type receptacles, but other coupling elements could also be used without departing from the scope of the disclosure. In the illustrated embodiment, a seal 140 is configured to mount the front body 130 for sealing an interface between the connector 100 and a mating receptacle (not shown), thereby making an ingress protected connection. The connector 110 can also optionally include a dust cover 142 that threadably couples to the coupling element 144 to protect the connector when not in use.

Figure 5:
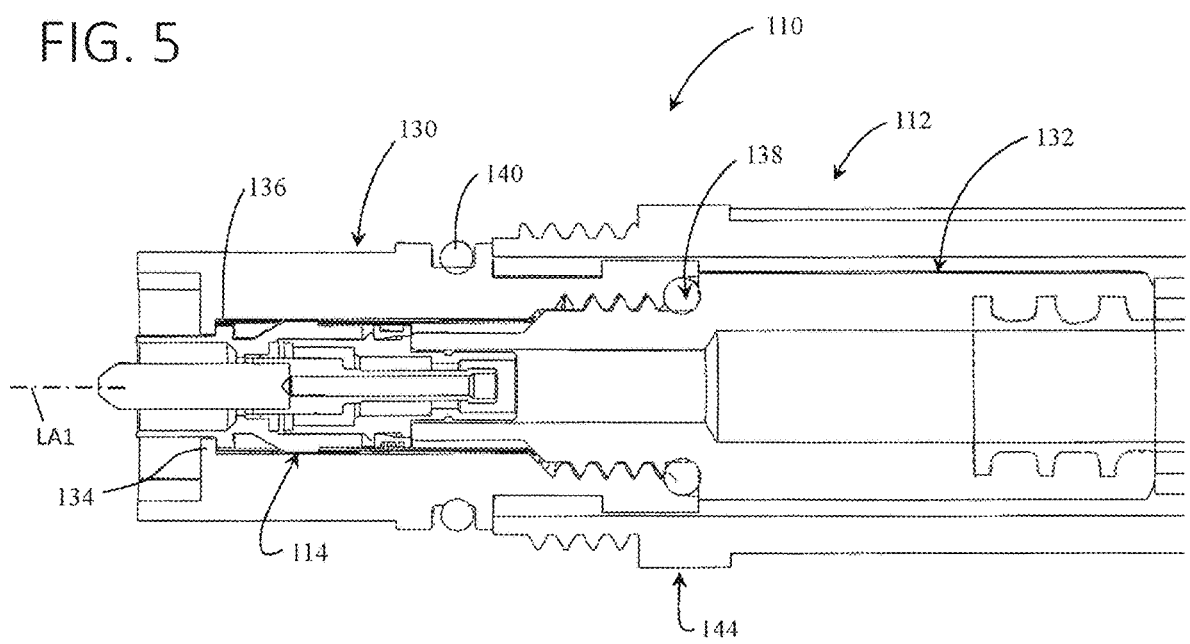
FIG. 5 is an enlarged fragmentary cross section of the fiber optic connector of FIG. 1.

As shown in FIG. 5, the front body 130 comprises an internal shoulder 134 (broadly, an internal stop), and the SC plug frame 122 comprises an external shoulder 136 (broadly, an external stop) configured to engage the internal shoulder to prevent the inner connector 114 from passing out of the front end portion of the outer housing 112. The front end portion of the back body 132 is configured to threadably couple to the front body 130 and to press the inner connector 114 forward in the outer housing 112 so that the external shoulder 136 engages the internal shoulder 134, thereby retaining the inner connector 114 between the front body 130 and the back body 132. In the illustrated embodiment, the outer housing 112 is ingress-protected and comprises a connector housing seal 138 configured to seal an interface between the front body 130 and the back body 132.

Figure 6:
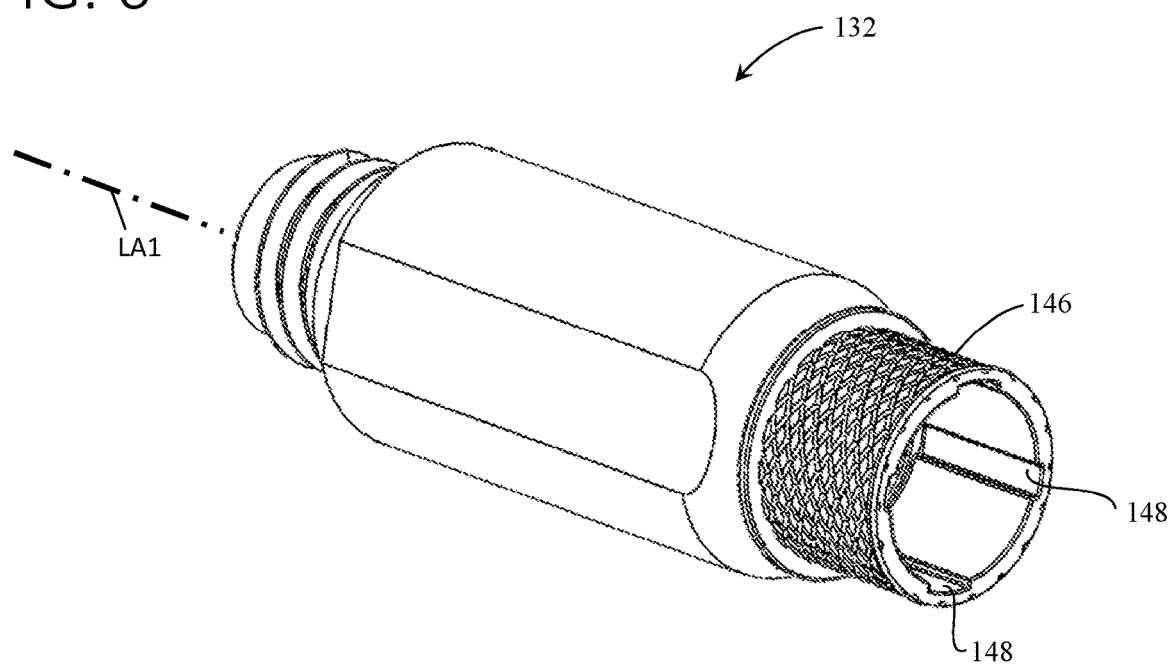
FIG. 6 is a perspective of a back body of the fiber optic connector of FIG. 1.
Figure 7:
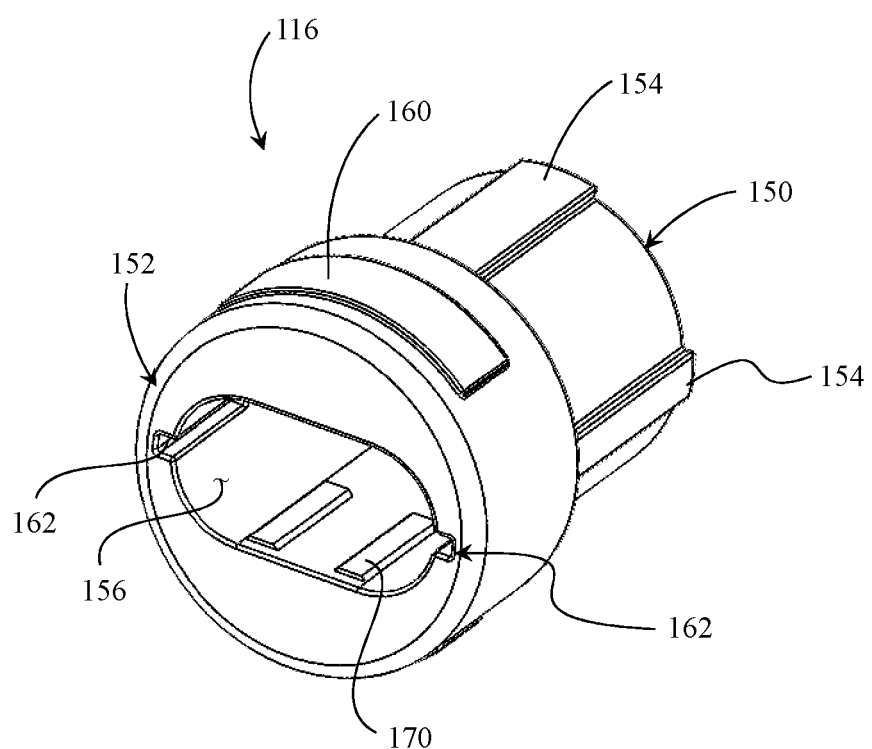
FIG. 7 is a perspective of a cable clamp insert of the fiber optic connector of FIG. 1.

Referring to FIG. 6, the back body 132 defines a back post 146 for supporting the crimp ring 118. The back post 146 can comprise an overmolded metal post member. In the illustrated embodiment, the back post 146 defines a plurality of internal keyways 148 (e.g., keying grooves) that form complementary keying features for circumferentially aligning the cable clamp insert 116 with the outer housing 112 about a longitudinal center axis LA1 of the connector 110. The keyways 148 also inhibit relative rotation of the back body 132 and the cable clamp insert 118 to inhibit twisting of the optical fiber inside the connector housing 112 during use.

Referring to FIGS. 7-10, the cable clamp insert 116 comprises a front insert portion 150 configured to be received in the back post 146 and a rear cable grip portion 152 configured to extend out of the back post so that at least a portion is exposed. The front insert portion 150 comprises a plurality of external keying ribs 154 configured to be slidably received in the keyways 148 to allow insertion of the cable clamp insert 116 into the back post 146. As can be seen, the keying ribs 154 align with the keyways 148 when the cable clamp insert 116 is in a proper circumferential orientation about the longitudinal axis LA1 to allow for insertion. When the keying ribs 154 are misaligned with the keyways 148 the insert 116 cannot be inserted into the back post. Hence, the back post 146 and the cable clamp insert 116 comprise complementary keying features 148, 154 configured to align the cable clamp insert with the back post. Moreover, during use of the connector 110, the keying ribs 154 received in the keyways 148 prevent the cable clamp insert 116 from rotating about the axis LA1 with respect to the outer housing 112 and thereby prevent twisting of the optical fiber inside the outer housing 112.

The cable clamp insert 116 defines a passage 156 for receiving the drop cable C therein. Along at least the cable grip portion 152 of the insert 116, the passage 156 has a perimeter that generally corresponds to the perimeter of the drop cable C. In the illustrated embodiment, the cross-sectional shape of the passage 156 is generally obround. Those skilled in the art will recognize that the cross-sectional shape of the passage 156 may have other shapes, like rectangular, round, etc.

Figure 8:
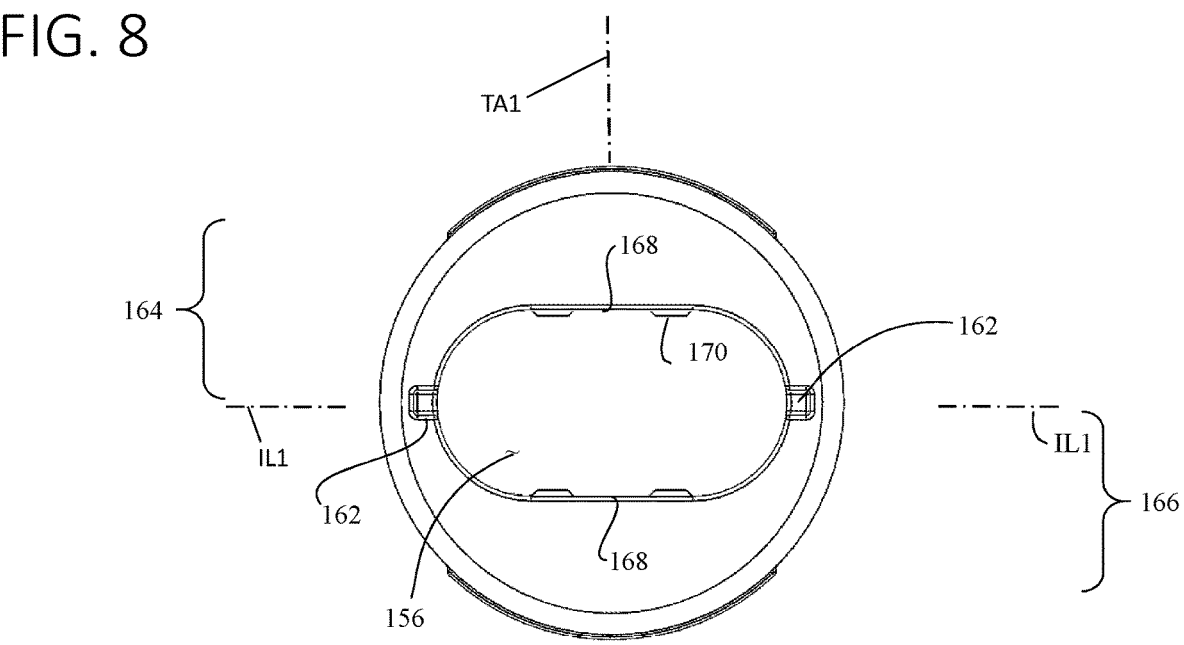
FIG. 8 is an elevation of the cable clamp insert.

The cable grip portion 152 is broadly configured to be compressed onto the drop cable C by the crimp ring 118. Referring to FIG. 8, the cable grip portion 152 comprises crush recesses 162 spaced apart along an imaginary line IL1 on opposite sides of the passage 156. The cable grip portion 152 has a first half 164 (broadly, a first section) on one side of the imaginary line IL1 and a second half 166 (broadly, a second section) on the opposite side of the imaginary line. The crush recesses 162 configure the cable clamp insert 116 so that the first and second sections 164, 166 deflect toward one another along transverse axis TA1, e.g., in directions generally perpendicular to the imaginary line Ill, when the crimp ring 18 is crimped.

Figure 9:
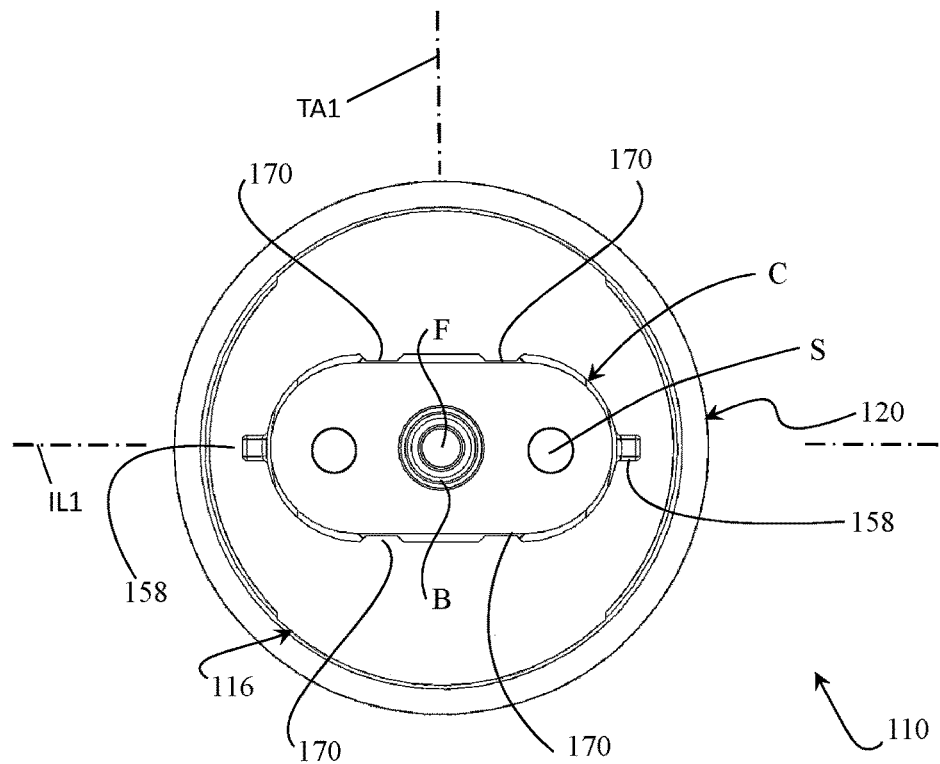
FIG. 9 is an elevation of the cable clamp insert on a drop cable.

In the illustrated embodiment, the imaginary line IL1 is generally halfway between, and parallel to, opposing broad sides 168 of the generally obround-shaped passage 156. Referring to FIG. 9, the cable grip portion 152 defines first and second gripping teeth 170 that protrude inward along the transverse axis TA1 from each broad side 168. The illustrated cable clamp insert 116 comprises two pairs of opposing gripping teeth 170 on opposite sides of the longitudinal center axis LA1. Each pair of gripping teeth 170 is generally laterally aligned with strength members S of the drop cable C. As is known to those skilled in the art, the illustrated drop cable C comprises strength members S located on opposite sides of a buffer tube B holding the optical fiber F. When the crimp ring 118 is compressed onto the cable grip portion 14, the gripping teeth 170 are pressed inward toward the strength members S and bite into the jacket J of the drop cable C.

Figure 10:
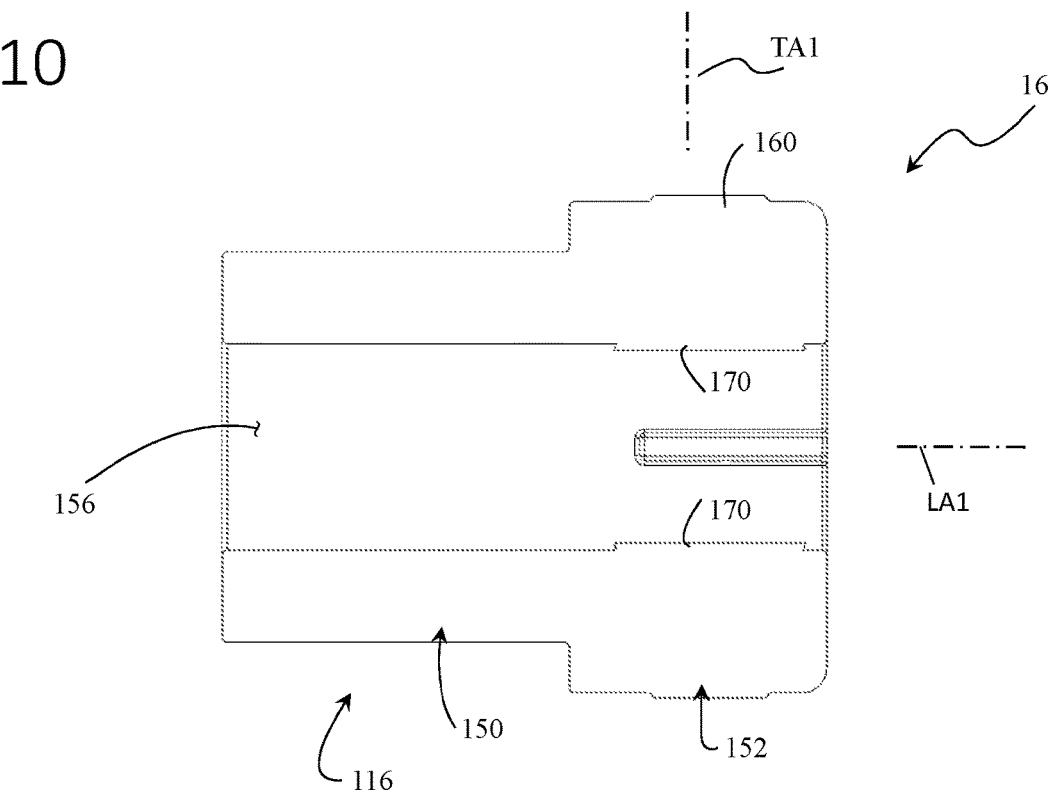
FIG. 10 is a longitudinal cross section of the cable clamp insert.

Referring to FIG. 10, in one or more embodiments, each gripping tooth 170 is an elongate gripping tooth having a first end and a second end spaced apart along a longitudinal axis LA1. In the illustrated embodiment, each end of each gripping tooth 170 has an undercut 170a, e.g., each end of the gripping tooth 170 slopes inward along the longitudinal axis as it extends outward along the transverse axis TA1 away from the longitudinal center axis CA1. The undercut ends of the gripping teeth 170 are intended to enhance the grip between the cable clamp insert 116 and the drop cable jacket J to prevent slippage of the cable C with respect to the cable clamp insert 116 when the cable is under tension.

In the illustrated embodiment, the cable grip portion 152 comprises external protrusions 160. When the crimp ring 118 is crimped onto the cable grip portion 152, it deforms against the external protrusions and thereby firmly attaches to the cable grip portion to inhibit slippage between the crimp ring and the cable clamp insert 116.

Figure 11:
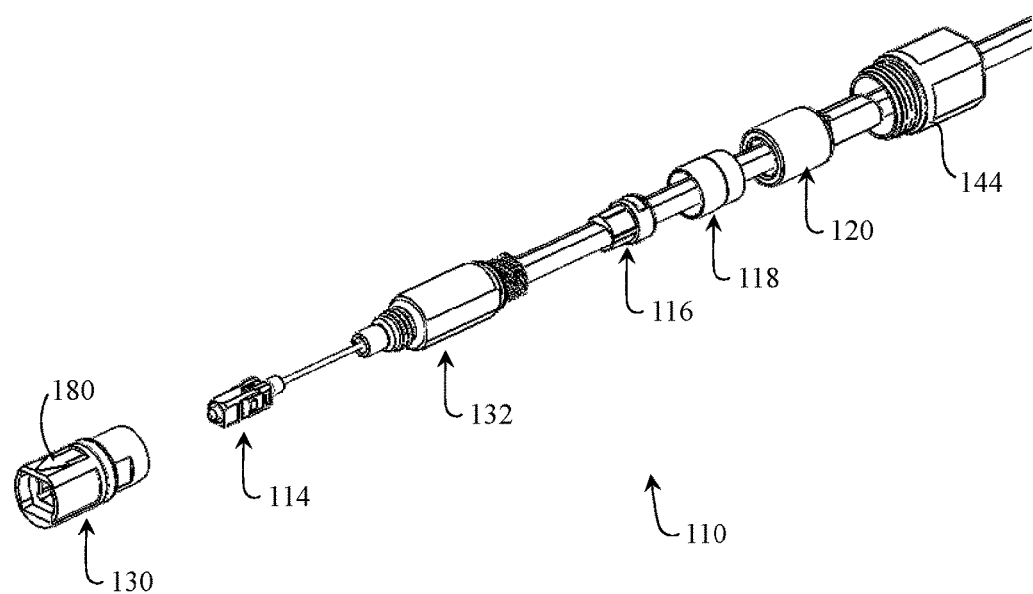
FIG. 11 is an exploded perspective of the fiber optic connector of FIG. 1 showing a step in a method of terminating a drop cable.

Referring to FIGS. 11-18, an exemplary method of terminating a drop cable C using the connector 110 will now be described. Referring to FIG. 11, initially, the drop cable C is prepared and threaded through the coupling element 144, the heat shrink 120, the crimp ring 118, the cable clamp insert 116, and the back body 132. Subsequently, the inner connector 114 is installed to terminate the cable. The inner connector 114 can then be loaded into the front body 130. In the illustrated embodiment, the front body 130 includes an indicator 180 on one side. The indicator 180 provides a visual indication for mating the connector 110 with a receptacle in the right orientation. The inner connector 114 is inserted so that the chamfered side of the plug frame 122 is on the same side as the indicator 180.

Figure 12:
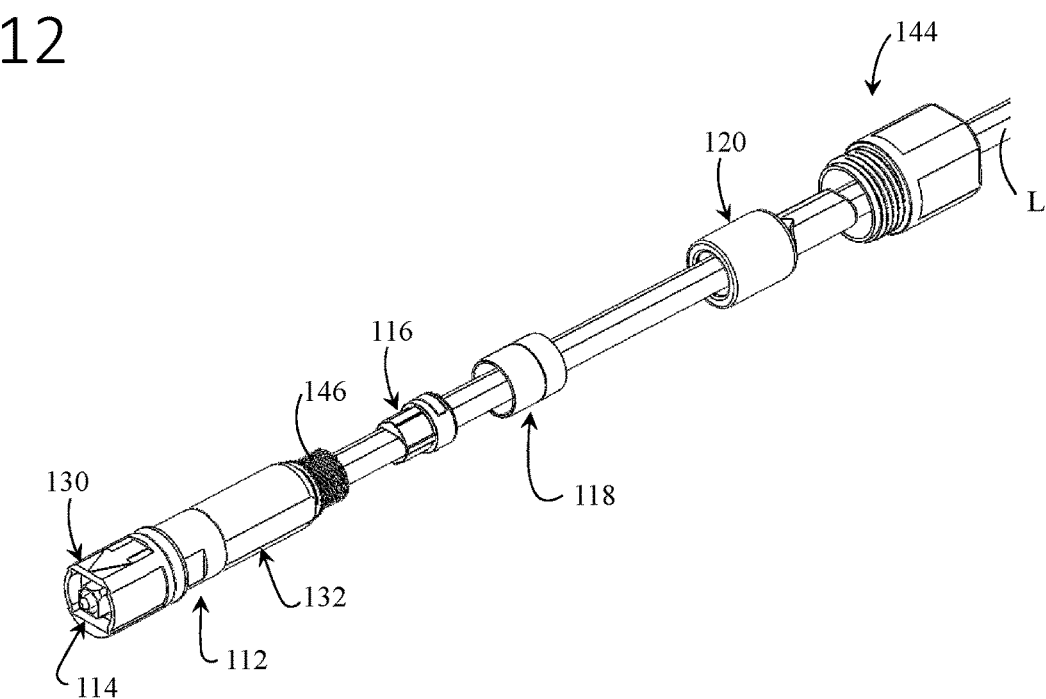
FIG. 12 is an exploded perspective of the fiber optic connector of FIG. 1 showing a subsequent step in a method of terminating a drop cable.

Referring to FIG. 12, next the back body 132 is threadably coupled to the front body 130 to secure the inner connector 114 inside the outer housing as described above. In one or more embodiments, curable epoxy is placed onto the external threads of the back body 132 before threading into the front body 130. The epoxy adheres to the back body 132 to the front body 130 once cured.

Figure 13:
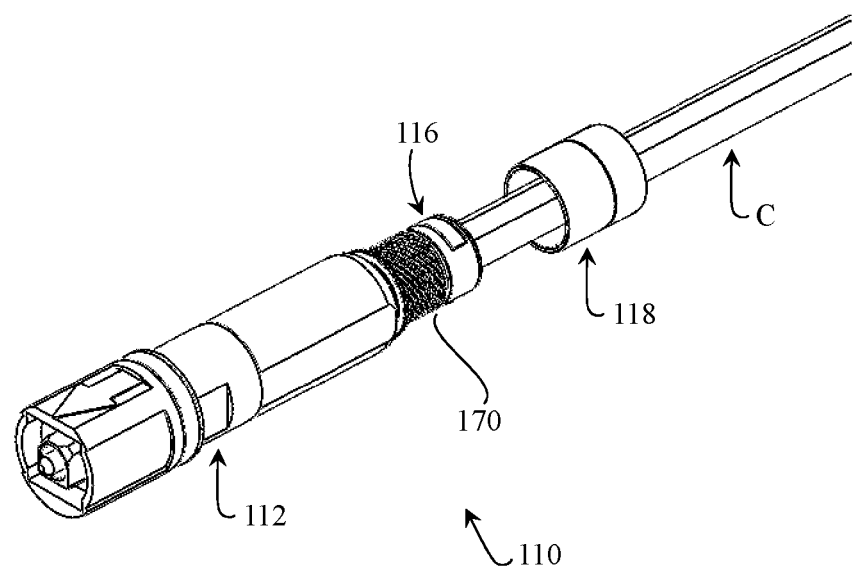
FIG. 13 is an exploded perspective of the fiber optic connector of FIG. 1 showing a subsequent step in a method of terminating a drop cable.

Referring to FIG. 13, after the outer housing 112 is assembled, the cable clamp insert 116 is advanced forward along the drop cable C into the back post 146. As explained above, the complementary keying features 148, 154 ensure the cable clamp insert 116 is received in the back post 146 in proper circumferential alignment with the back body 132.

Figure 14:
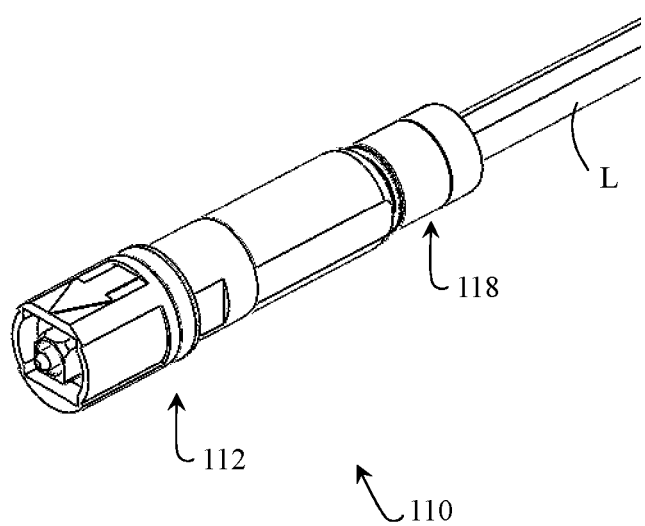
FIG. 14 is a perspective of a subassembly of the fiber optic connector of FIG. 1 showing a subsequent step in a method of terminating a drop cable.
Figure 15:
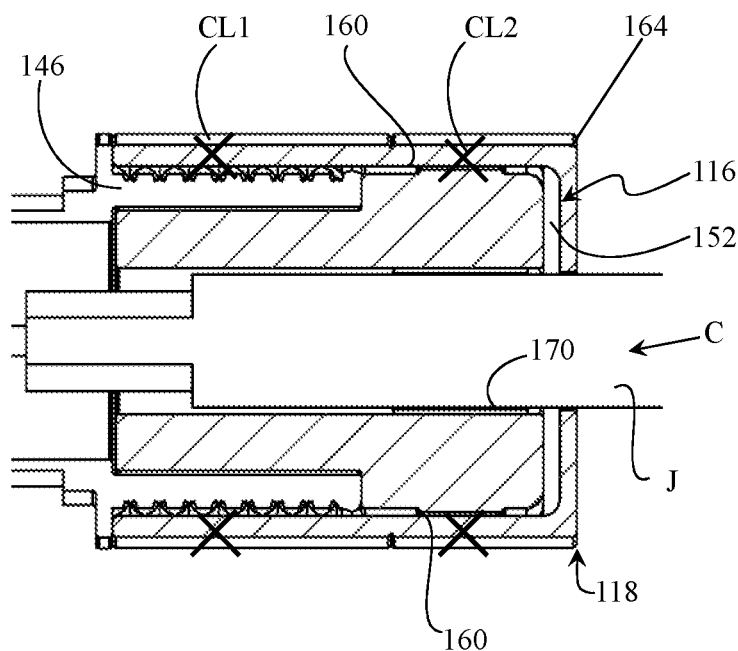
FIG. 15 is an enlarged fragmentary longitudinal cross section of a portion of the subassembly of FIG. 14.

Referring to FIGS. 14-15, after the cable clamp insert 116 inserted into the back post 146, the crimp ring 118 is advanced forward onto the back post 146 and cable grip portion 152 of the cable clamp insert 116. The crimp ring 118 is then crimped in at least two crimp locations CL1, CL2 (FIG. 15). Crimping the crimp ring 118 at the first crimp location CL1 compresses the crimp ring onto the back post 146 and thereby secures the crimp ring in place with respect to the outer housing 112. Crimping the crimp ring 118 at the second crimp location CL2 compresses the crimp ring 118 onto the cable grip portion 152. As explained above, this causes the cable grip portion to crush at the recesses 162 so that the first and second halves 164, 166 bend toward each other and the gripping teeth 170 bite into the cable jacket. This clamps the cable clamp insert 116 onto the drop cable C so that the cable is fixed in place with respect to the cable clamp insert 116. Crimping the crimp ring 118 at the second crimp location CL2 also deforms the crimp ring around the protrusions 160 to fix the crimp ring in place with respect to the cable clamp insert 116.

Accordingly, it can be seen that the cable clamp insert 116 and the crimp ring 118 together provide a firm connection between the drop cable C and the outer housing 112. The complementary keying features 148, 154 inhibit the cable clamp 116 from rotating relative to the housing 112 so that twist on the cable is not transferred to the bare fiber inside the connector 110. Crimping at the first crimp location CL1 creates a firm connection between the crimp ring 118 and the outer housing 112, and crimping at the second location CL2 creates a first firm connection between the crimp ring 118 and the cable clamp insert 116 and a second firm connection between the cable clamp insert 116 and the drop cable C. Accordingly, any tension or torque on the cable is transferred to the cable clamp insert 116, then to the crimp ring 118, and then to the outer housing. The cable clamp insert 116 and the crimp ring 118 together transfer forces on the cable to the outer housing 112 and bypass the inner connector 114 which is sensitive.

Figure 16:
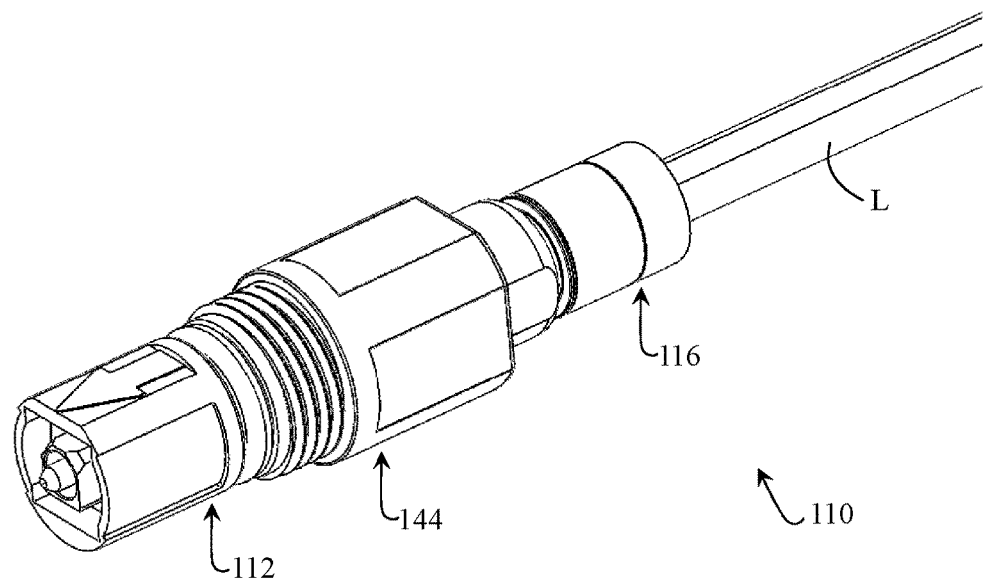
FIG. 16 is a perspective of a subassembly of the fiber optic connector of FIG. 1 showing a subsequent step in a method of terminating a drop cable.

Referring to FIG. 16, another step in an exemplary method of terminating a drop cable C using the connector 110 is to advance the coupling element 144 onto the outer housing 112. This can be performed after crimping.

Figure 17:
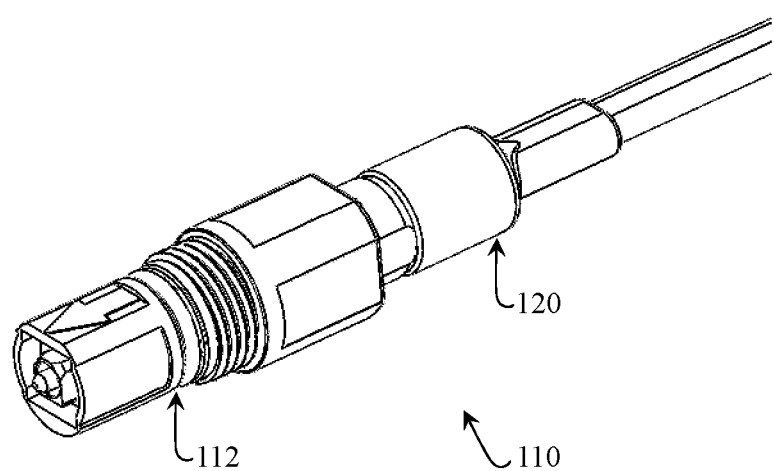
FIG. 17 is a perspective of the fiber optic connector of FIG. 1 terminating a drop cable.

Referring to FIG. 17, after loading the coupling element 144 onto the outer housing 112, the heat shrink tube 120 is installed. The front end portion of the heat shrink tube 120 is slid over the crimp ring 118 and back post 146. The rear end portion of the heat shrink tube 120 remains located on the cable C. Heat is then applied to shrink the heat shrink tube 120 and make a seal of the interface between the outer housing 112 and the cable C.

Figure 18:
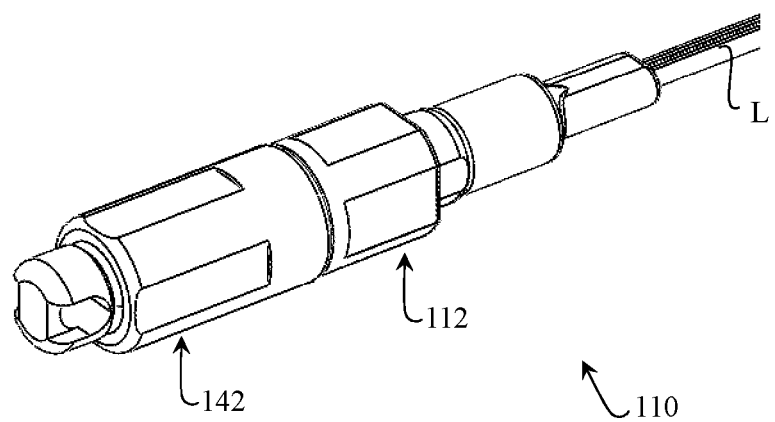
FIG. 18 is a perspective similar to FIG. 17 but showing a dust cap installed on the fiber optic connector.

Referring to FIG. 18, in certain embodiments, a dust cap 142 is installed on the front end portion of the outer housing 112 to complete connector assembly.

Figure 19:
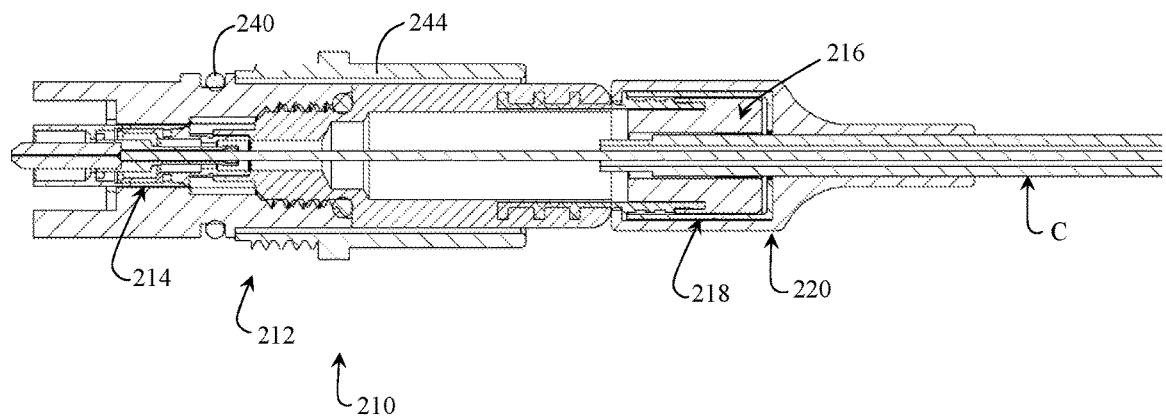
FIG. 19 is a longitudinal cross section of another embodiment of a fiber optic connector terminating a drop cable.
Figure 20:
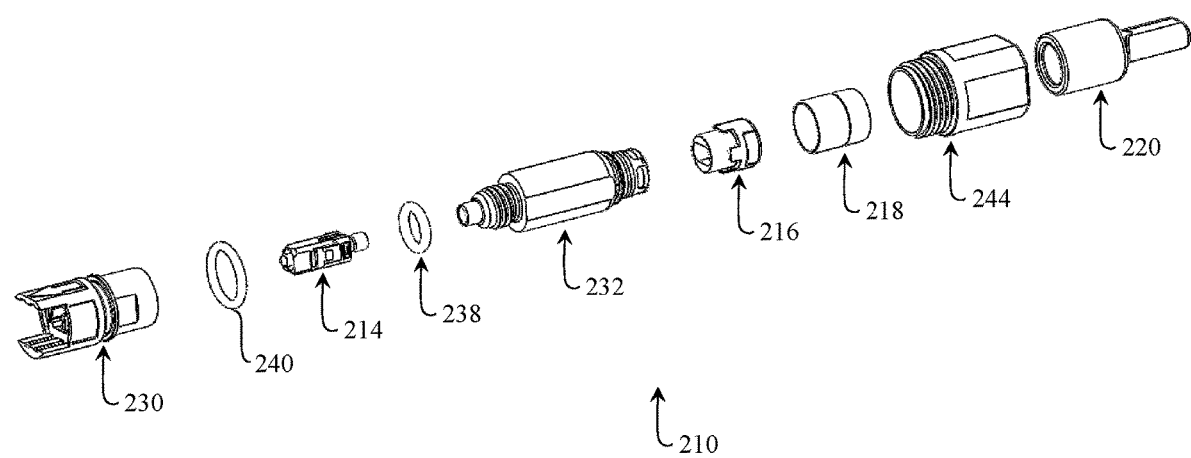
FIG. 20 is an exploded perspective of the fiber optic connector of FIG. 19.

Referring to FIGS. 19-20, another exemplary embodiment of a connector for terminating a drop cable C is generally indicated at reference number 210. The connector 210 is similar to the connector 110, and similar parts are given the similar reference number, plus 100. The connector 210 comprises an outer housing 212, an inner connector 214, a cable clamp insert 216, a crimp ring 218, and a heat shrink tube 220. The outer housing 212 is preferably a hardened, ingress-protected housing that is configured to hold and protect inner connector 214 of a standard, non-ingress-protected type. Suitably, the outer housing 212 is compatible with Optitap-type connection systems. The outer housing 212 comprises a front body 230, a back body 232, and a coupling element 244 configured for coupling the connector 210 to a mating receptacle (not shown). The front body 230 is configured to mount a seal 240 for sealing an interface between the connector 100 and a mating receptacle (not shown), thereby making an ingress protected connection. The outer housing 212 is ingress-protected, so it comprises a connector housing seal 238 configured to seal an interface between the front body 230 and the back body 232.

Figure 21:
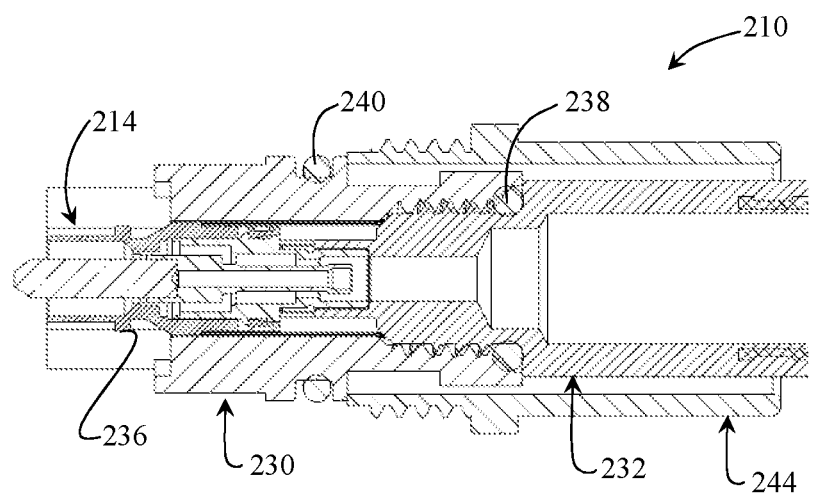
FIG. 21 is an enlarged fragmentary longitudinal cross section of the fiber optic connector of FIG. 19.
Figure 22:
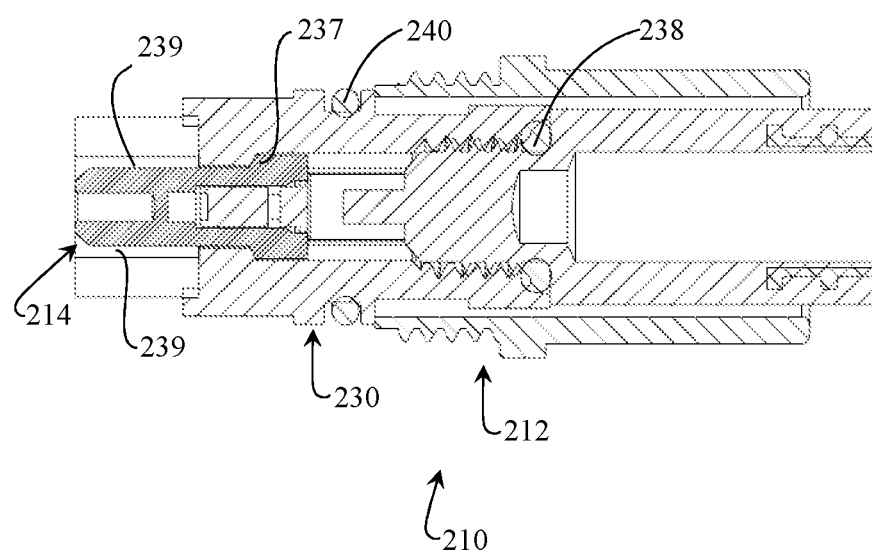
FIG. 22 is another enlarged fragmentary longitudinal cross section of the fiber optic connector of FIG. 19.

The connector 210 differs from the connector 110 in how inner connector 214 is received and secured in the outer housing 212. As shown in FIG. 21, the external shoulder 236 does not contact the front body 230 in the illustrated embodiment. Instead, as shown in FIG. 22, the connector 210 uses the ends 237 of plug body chamfers 239 as the feature that stops against the outer housing 212. The front body 230 comprises angled internal shoulders 234 (broadly, internal stops) configured to engage the chamfer ends 237 (broadly, external stops) to prevent the inner connector 214 from passing out of the front end portion of the outer housing 212. The stops 234, 237 locate the inner connector 214 at the proper location with respect to the outer housing 212 for making an optical connection to other Optitap-compatible equipment.

Figure 23:
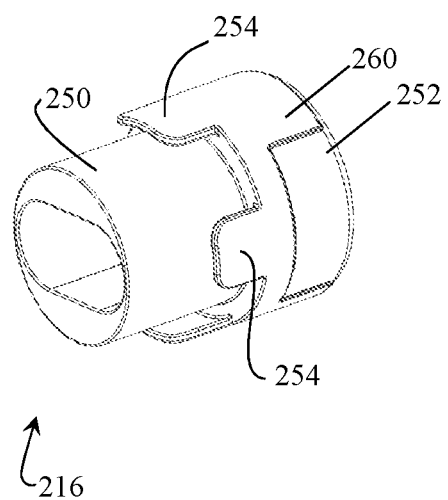
FIG. 23 is a perspective of a cable clamp insert of the fiber optic connector of FIG. 19
Figure 24:
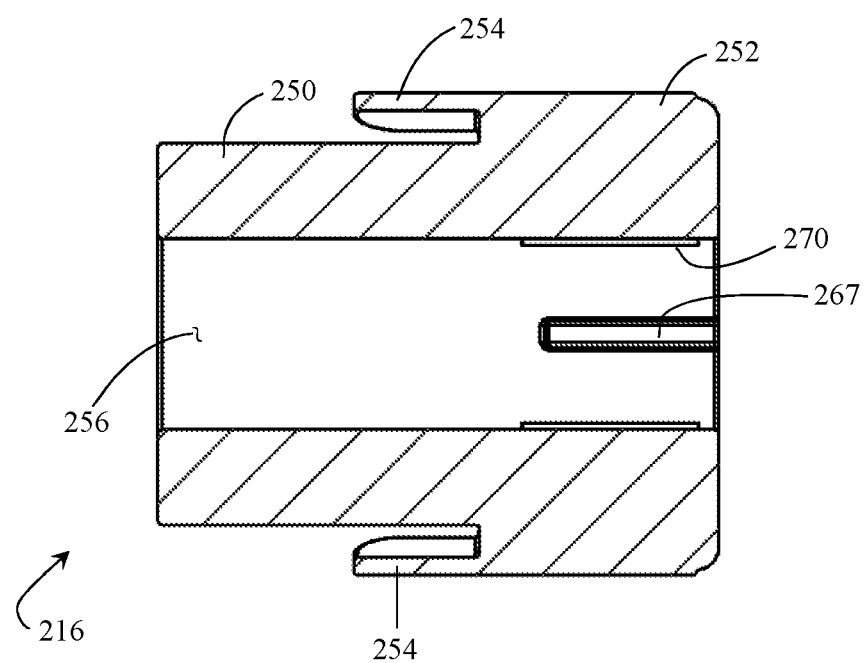
FIG. 24 is a longitudinal cross section of the cable clamp insert of FIG. 23.
Figure 25:
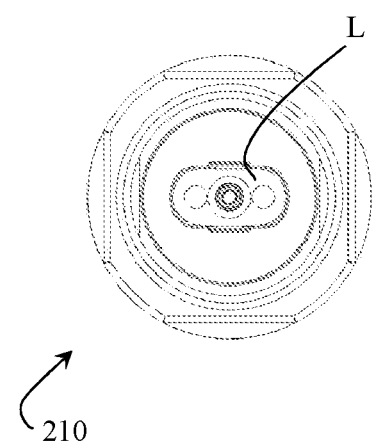
FIG. 25 is an elevation of the cable clamp insert of FIG. 23 on a drop cable.
Figure 26:
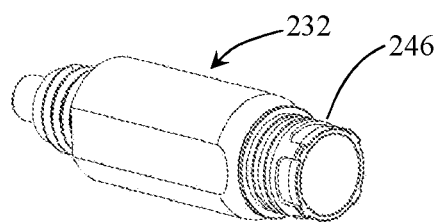
FIG. 26 is a perspective of a back body of the fiber optic connector of FIG. 19.
Figure 27:
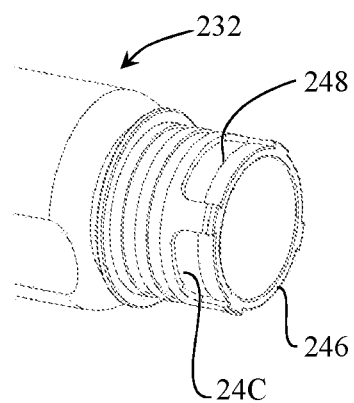
FIG. 27 is an enlarged fragmentary perspective of the back body of FIG. 26.
Figure 28:
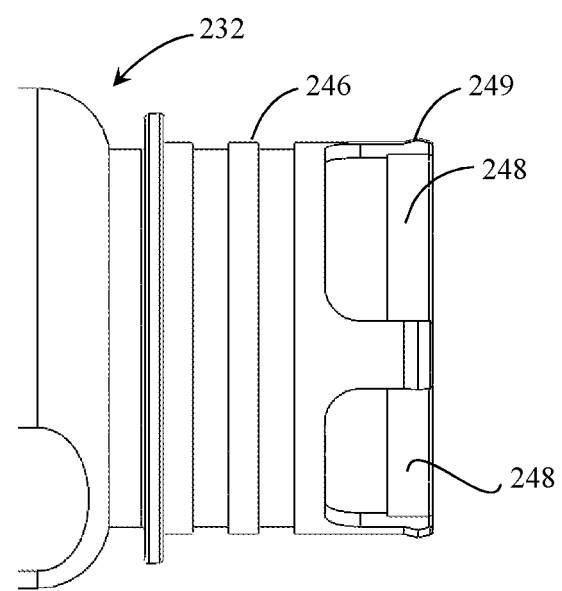
FIG. 28 is a fragmentary elevation of the back body of FIG. 26'
Figure 29:
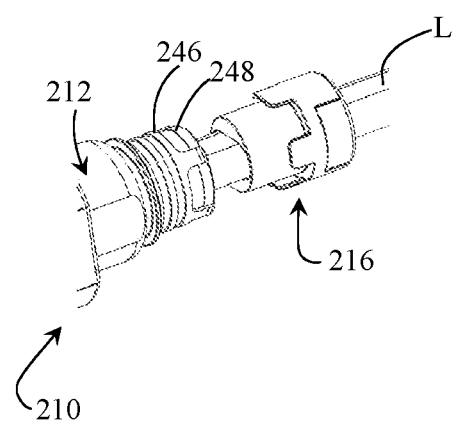
FIG. 29 is a fragmentary exploded perspective of the fiber optic connector of FIG. 19 showing a step in a method of terminating the fiber optic connector.
Figure 30:
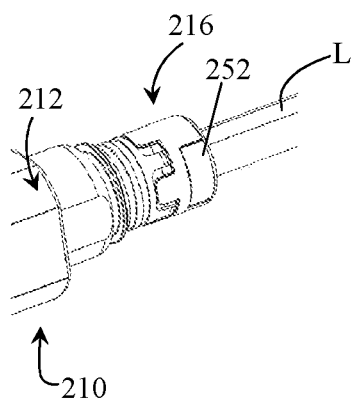
FIG. 30 is a fragmentary perspective of a subassembly of the fiber optic connector of FIG. 19 showing another step in the method.
Figure 31:
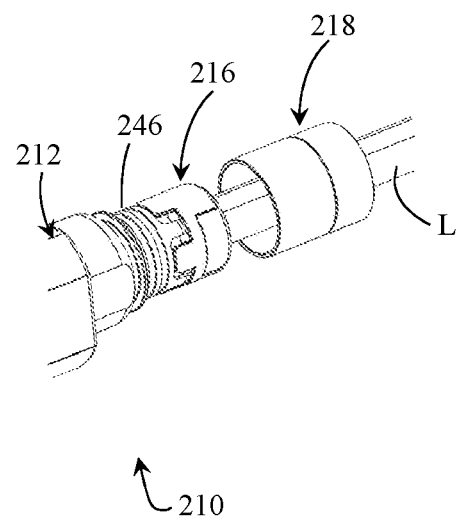
FIG. 31 is a fragmentary exploded perspective of a subassembly of the fiber optic connector of FIG. 19 showing another step in the method.
Figure 32:
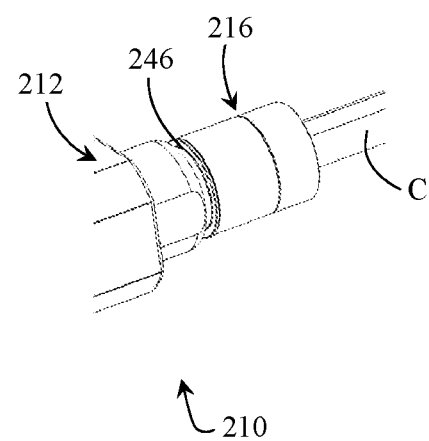
FIG. 32 is a fragmentary perspective of a subassembly of the fiber optic connector of FIG. 19 showing another step in the method.

Referring to FIGS. 23-28, the connector 210 also differs from the connector 110 in the type of complementary keying features used to circumferentially align the cable clamp insert 216 with respect to the back post 246 of the back body 232. As shown in FIGS. 23-24, instead of external keying ribs, the cable clamp insert 216 comprises forwardly projecting keying tabs 254. The keying tabs are spaced apart radially outward of the insert portion 250 of the cable clamp insert 216 so that the cable clamp insert 216 is configured to receive portions of the back post 246 in the gaps between the insert portion and the keying tabs 254. As shown in FIGS. 26-28, the back post 246 comprises external keyways 248 configured to receive the keying tabs 254. In one or more embodiments, the circumferential width of at least one of the keying tabs 254 is not equal to the circumferential width of at least one other keying tabs, and likewise the circumferential width of at least one keyway 248 is not equal to the circumferential width of at least one other keyway. This prevents the cable clamp insert 216 from being inserted into the back post 246 in incorrect circumferential orientations.

Referring to FIG. 28, in the illustrated embodiment, the tip of the back post 246 comprises arcuate raised features 249 between the keyways to enhance the connection to the crimp ring 218.

Referring to FIGS. 23-25, like the cable clamp insert 116, the cable clamp insert 216 defines a drop cable passage 256 for receiving the drop cable C therein. The passage 256 has a perimeter that generally corresponds to the perimeter of the drop cable C, and the cable grip portion 252 comprises crush recesses 262 and gripping teeth 270 that function the same as the corresponding components of the cable clamp insert 116. In the illustrated embodiment, the cable grip portion 252 comprises raised features 260 that enhance the connection to the crimp ring 218 in generally the same way as the features 160 of cable clamp insert 116.

Figure 33:
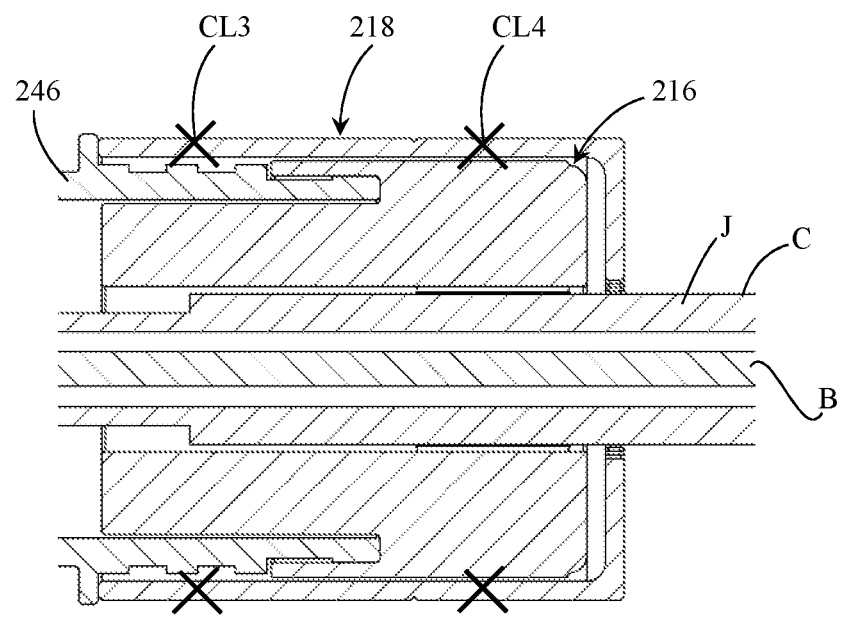
FIG. 33 is an enlarged fragmentary longitudinal cross section of the subassembly of FIG. 32.

In general, the method of terminating a drop cable C with the connector 210 is essentially the same as the method of terminating a drop cable with the connector 110. As shown in FIGS. 29-33, after the outer housing 212 is assembled, the cable clamp insert 216 is advanced forward along the drop cable C into the back post 246. The complementary keying features 248, 254 circumferentially align the cable clamp insert 216 with the back post 246. After the cable clamp insert 216 is inserted into the back post 246, the crimp ring 218 is advanced forward onto the back post 246 and cable grip portion 252 of the cable clamp insert 216. The crimp ring 218 is then crimped in at least two crimp locations CL3, CL4 (FIG. 33). Crimping the crimp ring 218 at the first crimp location CL3 compresses the crimp ring onto the back post 246, and crimping the crimp ring at the second crimp location CL4 compresses the crimp ring onto the cable grip portion 252. As explained above, this crushes the cable grip portion 252 at the recesses 262 so that the first and second halves of the cable grip portion 252 bend toward each other and the gripping teeth 270 bite into the cable jacket. As above, the cable clamp insert 216 and the crimp ring 218 cooperate to provide a firm connection between the drop cable C and the outer housing 212.

Figure 34:
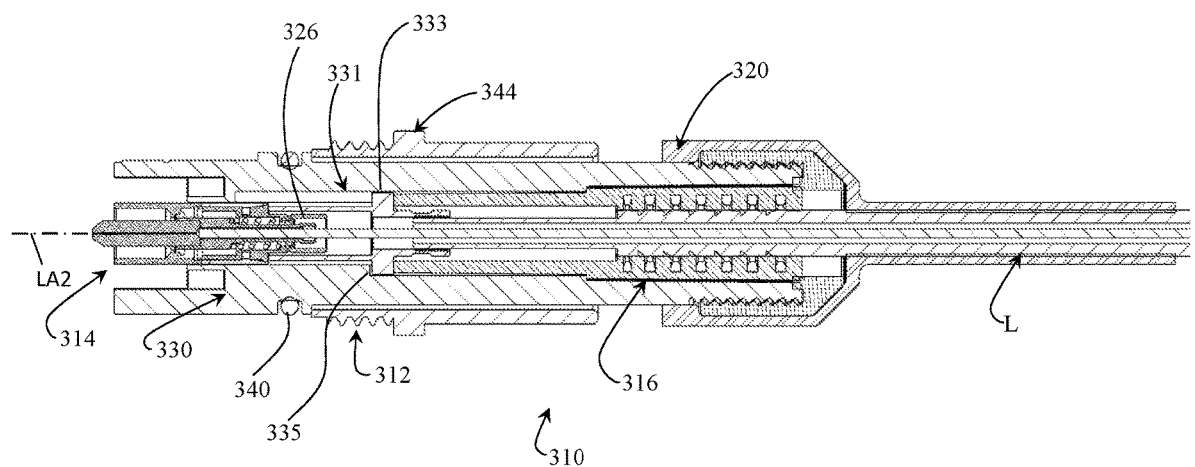
FIG. 34 is a longitudinal cross section of another embodiment of a fiber optic connector terminating a drop cable.
Figure 35:
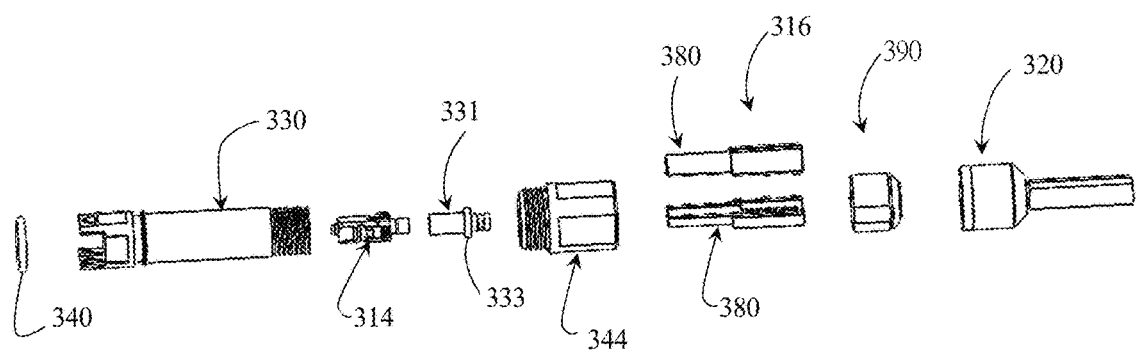
FIG. 35 is an exploded perspective of the fiber optic connector of FIG. 34.

Referring to FIGS. 34-35, another exemplary embodiment of a connector for terminating a drop cable C is generally indicated at reference number 310. The connector 310 is similar to the connector 110, and similar parts are given the similar reference number, plus 200. The connector 310 comprises an outer housing 312, an inner connector 314, a cable clamp insert 316, and a heat shrink tube 320. The illustrated connector 310 does not use a crimp ring crimped on the outer housing 312. The outer housing 312 is preferably a hardened, ingress-protected connector housing configured to hold and protect inner connector 314 of a standard, non-ingress-protected type. Suitably, the outer housing 312 is compatible with IP Solid-type connection systems. Hence, the connector 310 comprises a coupling element 344 for coupling the connector to a mating receptacle (not shown) and a seal 340 for sealing an interface between the connector 310 and a mating receptacle.

In the illustrated embodiment, the illustrated outer housing 312 comprises one piece main body 330 for holding the inner connector 314, instead of using a front body and a back body that require seal between them. The heat shrink tube 320 is configured to seal the interface between the rear end portion of the main body 330 and the drop cable C, and is the only seal required to ingress protect the outer housing 312. The inventor believes that combining the front and back bodies into a single main body improves ingress protection by eliminating one potential leak interface.

In the illustrated embodiment, the inner connector 314 comprises an extended crimp ring 331 configured to crimp onto the inner connector crimp post 326. The crimp ring 331 comprises a flange 333 having a front face and a back face, and the main body 330 includes an inner shoulder 335 configured to engage the front face of the flange. The cable clamp insert 316 is formed from two identical clamp shells 380 (explained in detail below).

Figure 36:
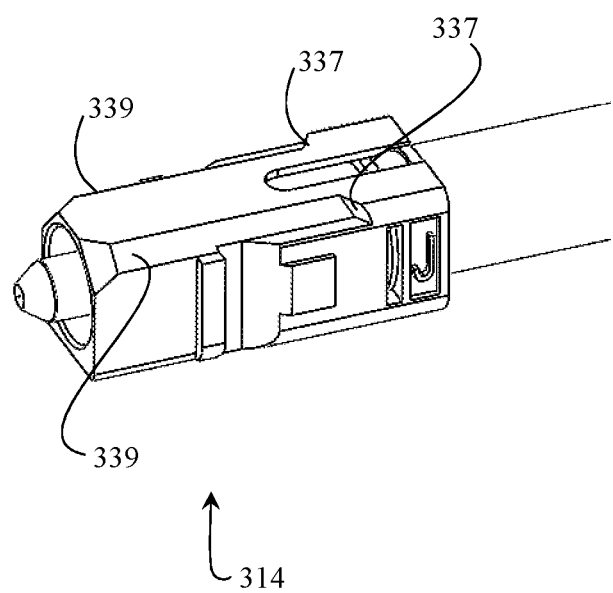
FIG. 36 is a perspective of an inner connector of the fiber optic connector of FIG. 34.
Figure 37:
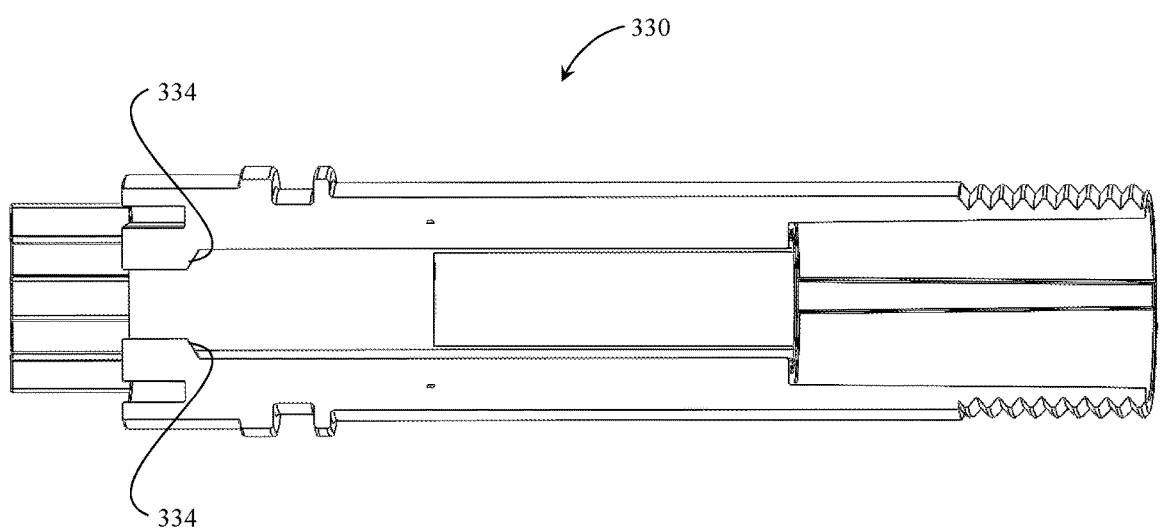
FIG. 37 is a longitudinal cross section of a main body of the fiber optic connector of FIG. 34.
Figure 38:
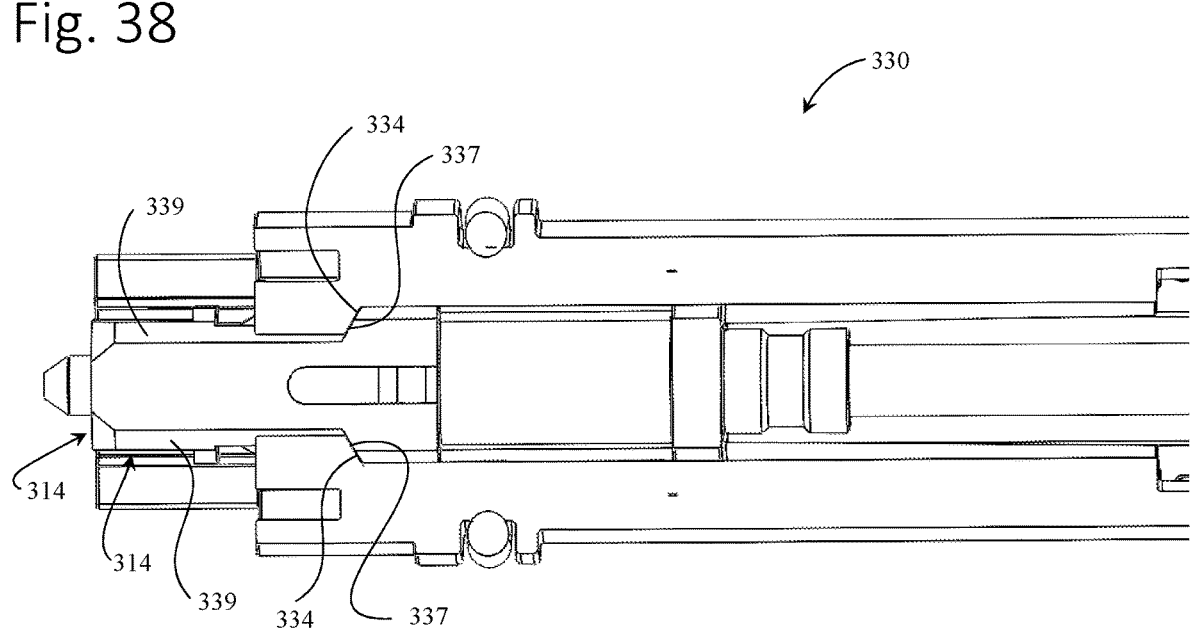
FIG. 38 is a longitudinal cross section of the fiber optic connector of FIG. 34 in the same plane of the main body as FIG. 37.

Referring to FIGS. 36-38, like the connector 210, the connector 310 also uses the ends 337 of plug body chamfers 339 as a stop feature for longitudinal positioning of the inner connector 314 within the outer housing 312. The main body 330 of the outer housing 312 comprises angled internal shoulders 334 (broadly, internal stops) configured to engage the chamfer end surfaces 337 (broadly, external stops) of the inner connector 314 to stop the inner connector from passing out of the front end portion of the outer housing 312 and position the inner connector at the proper location with respect to the outer housing for making an optical connection to other Optitap-compatible equipment.

Figure 39:
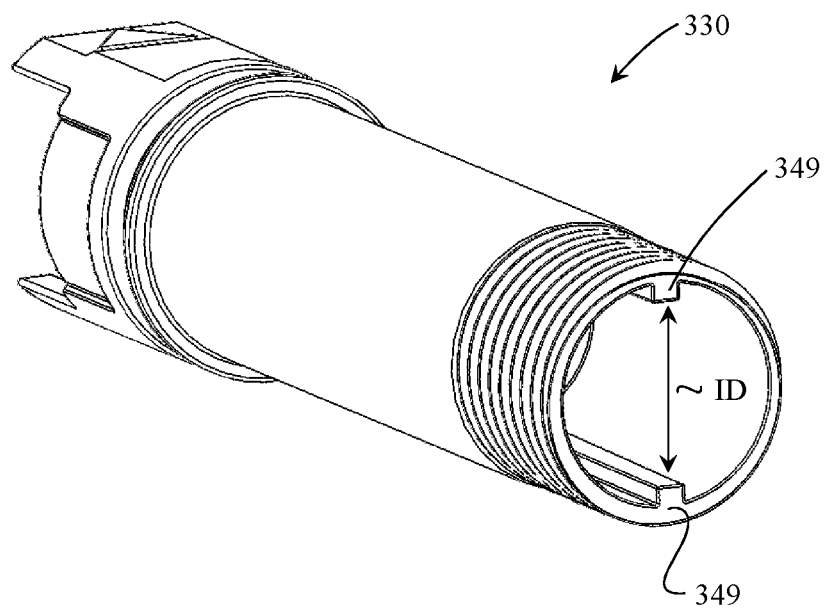
FIG. 39 is a perspective of the main body.

Referring to FIG. 39, the back end portion of the main body 330 is externally threaded and defines a pair of opposing internal keying rails 349. As explained in further detail below, the keying rails 349 are configured to align the main body 330 circumferentially with respect to the cable clamp insert 316 in a similar manner to the other complementary keying features described above. The opposing keying rails 349 have surfaces that define a distance ID. In one or more embodiments, the distance ID may be bigger or smaller than the inner diameter of the end portion of the main body 330.

Figure 40:
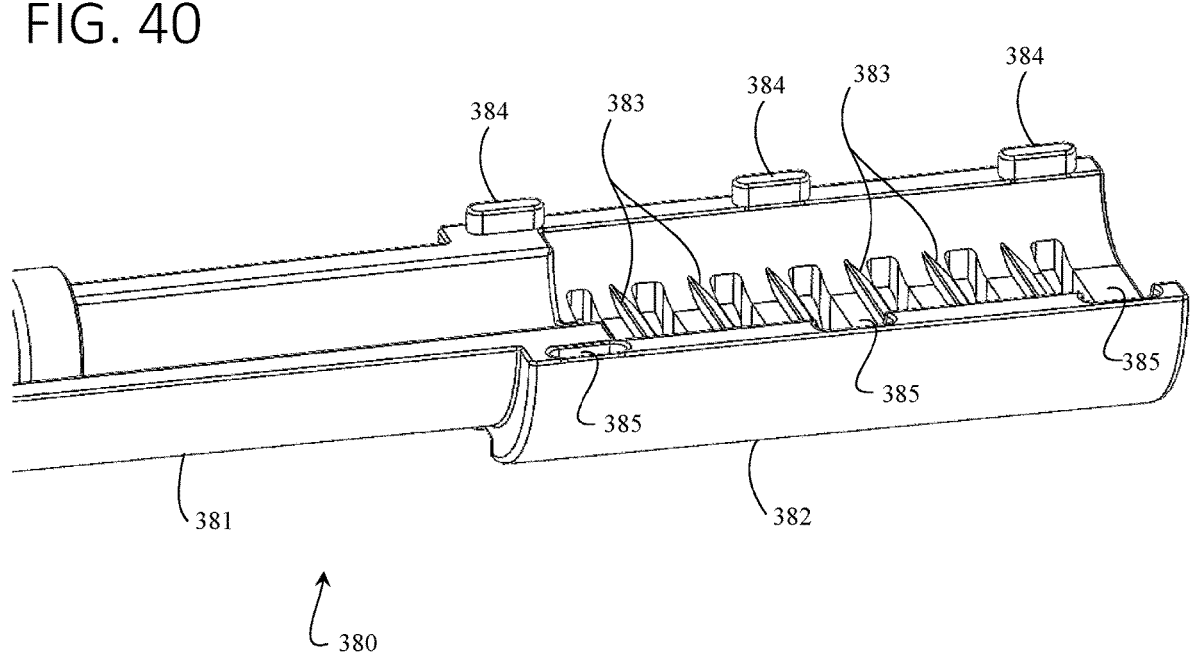
FIG. 40 is an enlarged fragmentary perspective of a subassembly of the fiber optic connector of FIG. 34 including a clamp shell thereof.

Referring to FIG. 40, in the illustrated embodiment, each clamp shell 380 comprises a front section 381 and an enlarged rear section 382. Two clamp shells 380 are configured to be pressed together to form a cable clamp insert 316 that defines a longitudinal cable passage 356 (see FIG. 42). Each clamp shell 380 comprises a plurality of cable gripping teeth 383 at longitudinally spaced apart locations along the rear section 382. The gripping teeth 383 may be formed with different shapes. In this example, the gripping teeth 383 is formed with a ridge shape to increase the gripping of the cable. The rear portion 382 may also include a plurality of shell alignment tabs 384 on one side and a corresponding number of shell alignment recesses 385 on the other side. Two clamp shells 380 are configured to be pressed together on the drop cable C so that the alignment tabs 384 of each clamp shell are received in the alignment recesses 385 of the other clamp shell. When the clamp shells 380 are snapped together, the teeth 383 bite into the cable jacket J.

Figure 41:
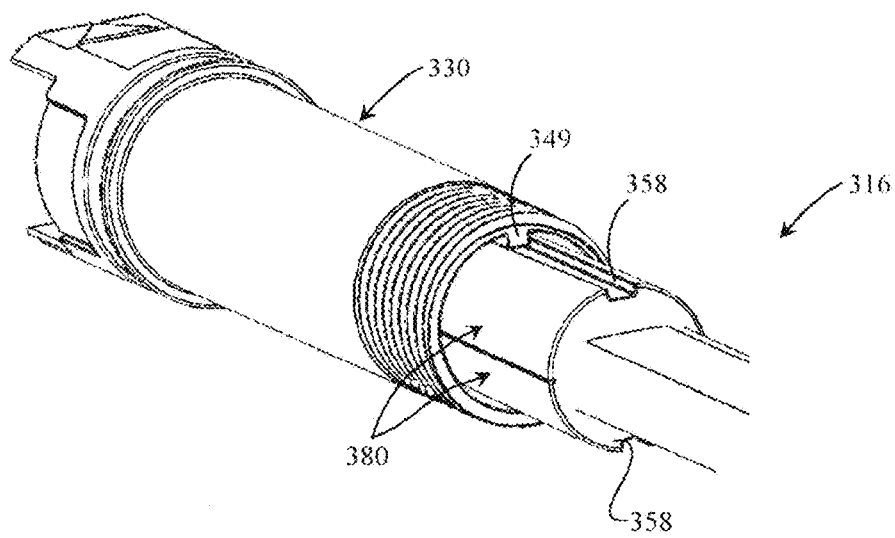
FIG. 41 is a partially exploded perspective of a subassembly of the fiber optic connector of FIG. 34 showing a cable clamp insert being inserted into the main body.

Referring to FIG. 41, each clamp shell 380 further comprises a keyway 358 along the rear section 382. When the clamp shells 380 are secured together and accommodate the drop cable C, the cable clamp insert 316 is inserted into the rear end of the main body 330 of the outer housing 312 so that the keying rails 349 are slidably received in the keyways 358. Those skilled in the art would appreciate the shapes of the keying rails and keyway are interchangeable. That is, the keyway may be provided on the main body and the keying rails may be provided on the clamp shell. Like the complementary keying features of the above-described embodiments, the keyways 358 and keying rails 349 of the present embodiment form complementary keying features that are configured to align the cable clamp insert 316 circumferentially with the main body 330 and inhibit twist of the cable clamp insert in relation to the outer housing 312 during use of the connector 310.

Figure 42:
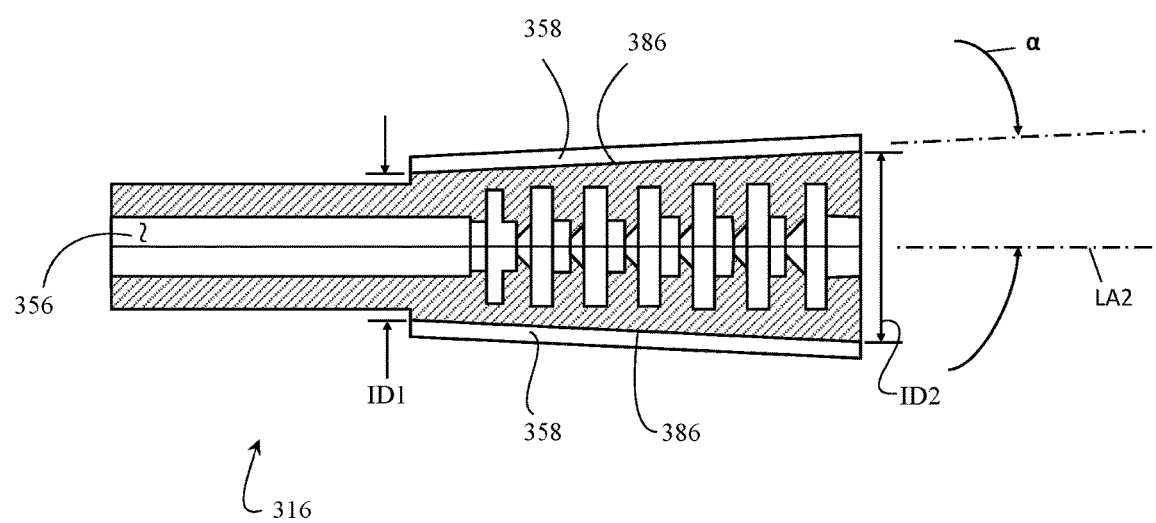
FIG. 42 is a cross-sectional illustration of the cable clamp insert with tapered surfaces 386 shown at exaggerated skew angles for clarity.

Referring to FIG. 42, in the illustrated embodiment, the cable clamp insert 316 has a cross-sectional dimension that tapers along the longitudinal axis LA2 such that the cross-sectional dimension decreases as the cable clamp insert 316 extends longitudinally from the rear end toward the front end. In FIG. 42, the amount of tapering is exaggerated to clearly illustrate the feature in question. Each keyway 358 has a tapered surface 386 facing outward. The opposing tapered surfaces 386 extend at respective skew angles α relative to the longitudinal axis LA2. In one or more embodiments, the skew angles α are in an inclusive range of from 0.1° to 10°. At their front ends, the tapered surfaces 386 are configured to define a first outer dimension OD1 less than or equal to the inner dimension ID of the keying rails 349. And at their rear ends, the tapered surfaces 356 are configured to define a second outer dimension OD2 slightly greater than the inner dimension ID of the keying rails 349. Accordingly, when the cable clamp insert 316 is inserted into the main body 330, the keying rails 349 will bear against the tapered surfaces 386 and urge the clamp shells 380 together progressively greater force as the cable clamp insert 316 advances forward.

Figure 43:
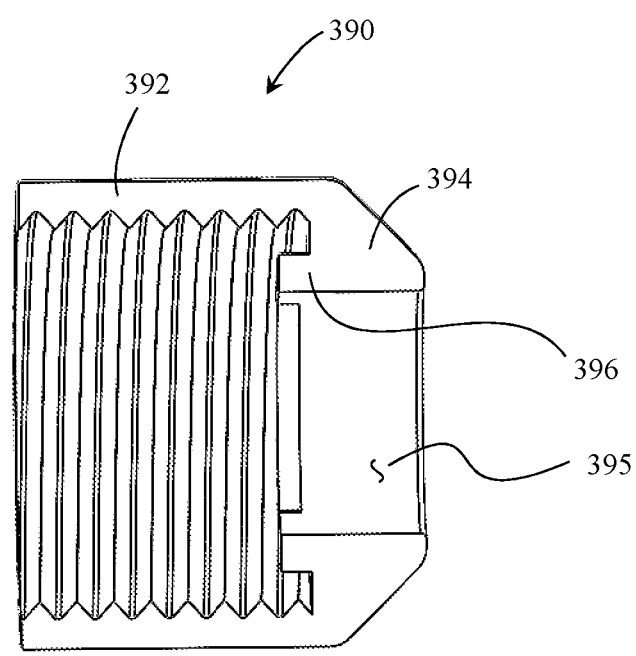
FIG. 43 is a longitudinal cross section of a cable clamp retainer of the fiber optic connector of FIG. 34.

Referring to FIG. 43, the connector 310 further comprises a cable clamp retainer 390 configured to be coupled to the rear end portion of the main body 330 for holding the cable clamp insert 316. In the illustrated embodiment, the cable clamp retainer 390 comprises an internally threaded annular portion 392 configured for threadably connecting to the externally threaded rear end portion of the main body 330. The cable clamp retainer 390 further comprises a rear end portion 394 extending from the annular portion 392. The rear end portion 394 defines a cable opening 395 that is sized to allow the drop cable C pass into the cable clamp retainer 390 and then to the connector housing 312. The cable clamp retainer 390 further comprises a pushing element 396 projecting from the rear end portion 394 towards the annular portion 392 so that the pushing element can be received inside the rear end portion of the main body 330.

Figure 44:
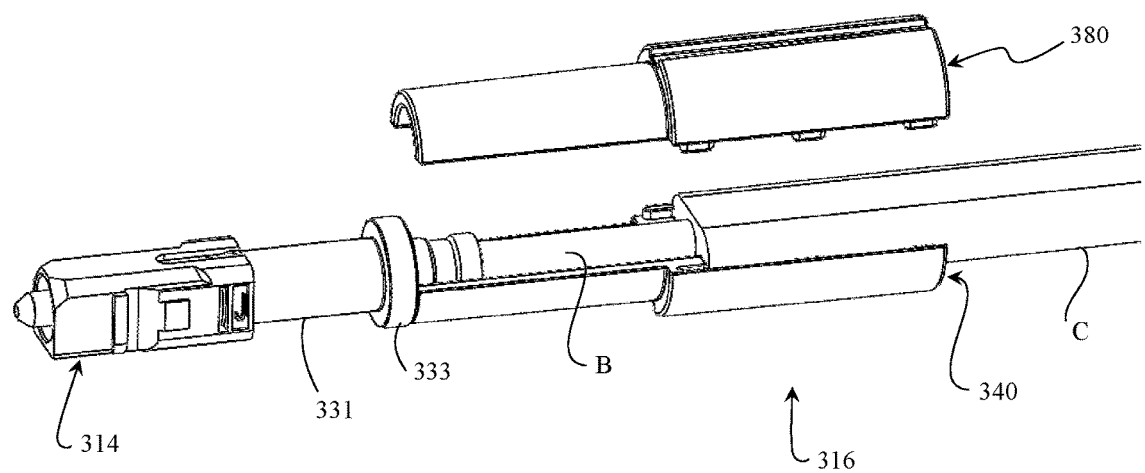
FIG. 44 is an exploded perspective of a subassembly of the fiber optic connector of FIG. 34 showing a step in a method of terminating a drop cable.
Figure 45:
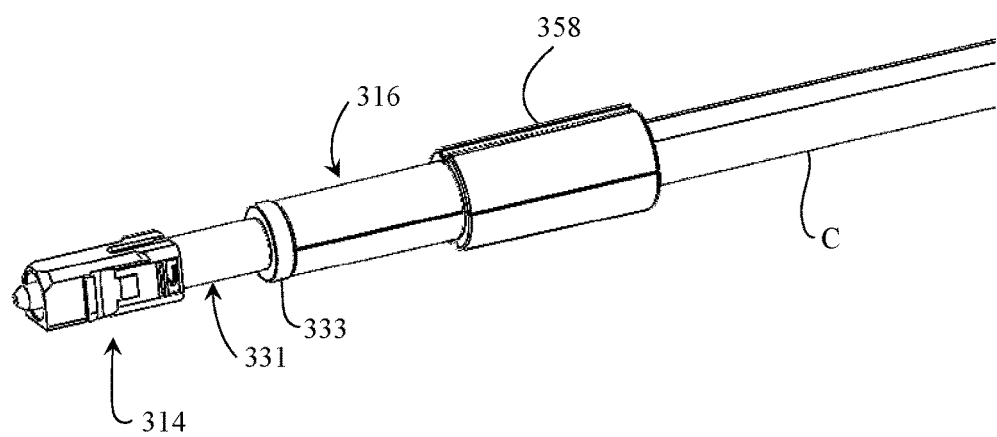
FIG. 45 is a perspective of a subassembly of the fiber optic connector of FIG. 34 showing another step in the method.

Referring to FIGS. 44-51, an exemplary method of terminating the drop cable C with the fiber optic connector 310 will now be described. Initially, the drop cable C is prepared and threaded through the coupling element 344, the heat shrink 320, and the cable clamp retainer 390. That is, the coupling element, heat shrink 320, and cable clamp retainer 390 are preinstalled to the cable C. Subsequently, the extended crimp ring 331 is loaded onto the prepared optical fiber, the inner connector 314 is installed, and the extended crimp ring is crimped onto the inner connector crimp post 326. Referring to FIGS. 44-45, the two clamp shells 380 of the cable clamp insert 316 are then snapped to the drop cable C from two sides. Preferably, the two clamp shells 380 are pressed together so that the front end of the cable clamp insert 316 is in direct contact with the back face of the flange 333. But as explained in further detail below, the connector 310 has built in tolerance for misalignment of the cable clamp insert 316. The inventor believes that small misalignments of this type will naturally sometimes occur during assembly, so building tolerance into the design can provide a more consistently robust and reliable end product. The jacket J of the cable C is received between the teeth 383 of the clamp shells 380.

Figure 46:
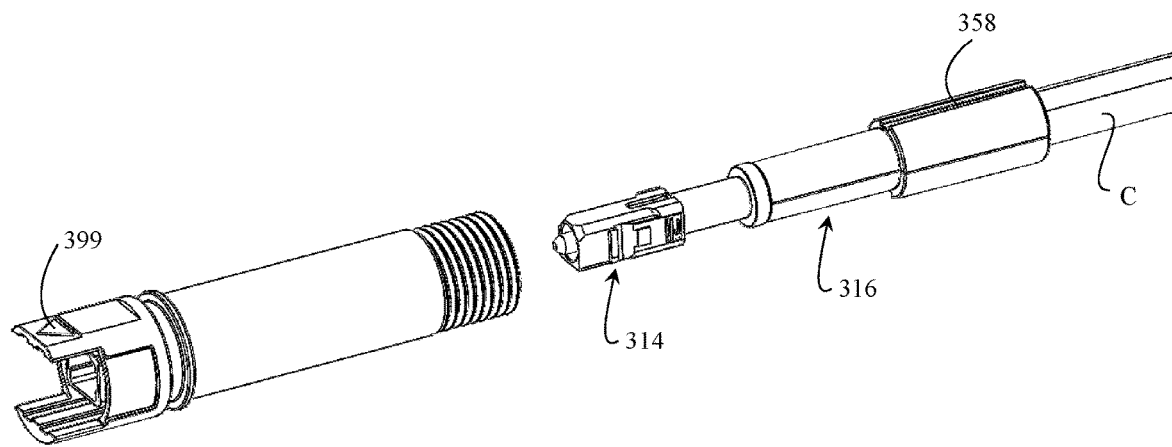
FIG. 46 is an exploded perspective of a subassembly of the fiber optic connector of FIG. 34 showing another step in the method.
Figure 47:
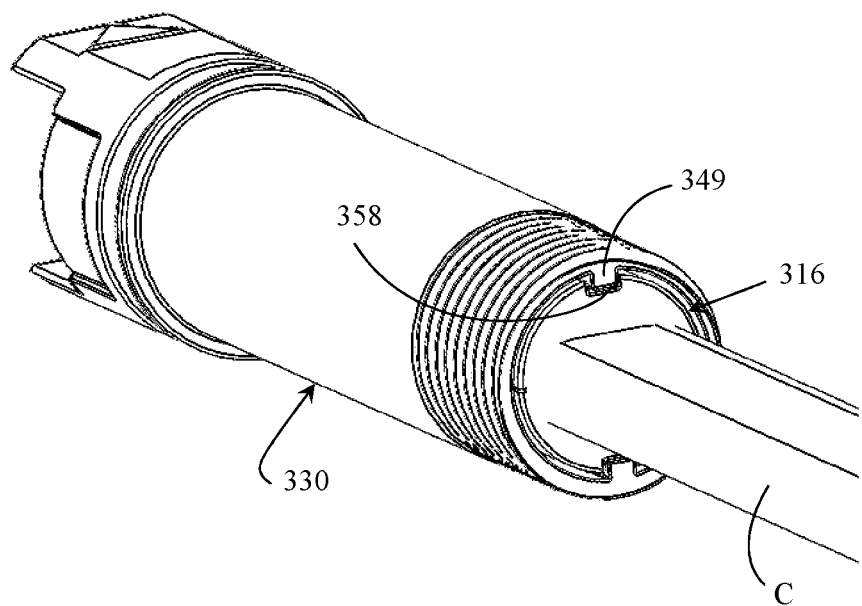
FIG. 47 is a perspective of a subassembly of the fiber optic connector of FIG. 34 showing another step in the method.

Referring to FIGS. 46-47, next the inner connector 314 and cable clamp insert 316 are loaded into the main body 330 of the outer housing 312. Again, the inner connector 314 can be inserted so that the chamfered side of the inner connector 314 is on the same side as an indicator 399 of the outer housing. The cable clamp insert 316 is circumferentially aligned with the main body 330 so that the keying rails 349 slide into the keyways 358. As the cable clamp insert 316 is inserted into the main body 330, the keying rails 349 bear against the tapered surfaces 386 and the outer housing 312 urges the two clamp shells 380 together progressively more tightly. Before installing the cable clamp retainer 390 on the main body 330 the coupling element 344 is preferably loaded onto the main body.

Figure 48:
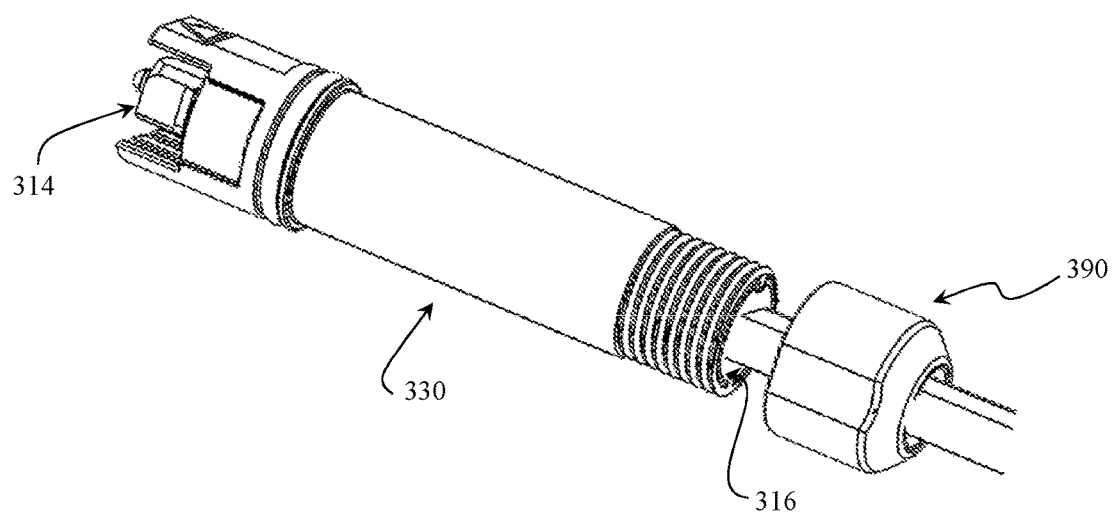
FIG. 48 is an exploded perspective of a subassembly of the fiber optic connector of FIG. 34 showing another step in the method.
Figure 49:
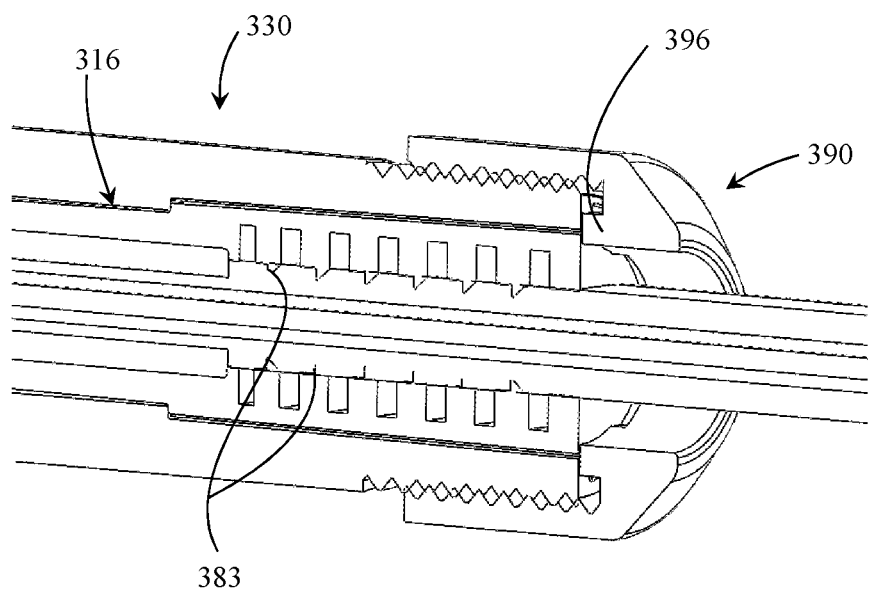
FIG. 49 is an enlarged fragmentary cross section of the subassembly of FIG. 49 after being assembled.

Referring to FIGS. 48-49, to advance the inner connector 314 and the cable clamp insert 316 fully forward, the cable clamp retainer 390 is threaded onto the main body. A wrench may be used to tighten the connection of the retainer 390 with the main body 330. As the cable clamp retainer 390 is tightened, the pushing element 396 engages the rear end of the cable clamp insert 316 and presses it forward. The cable clamp insert 316 advances forward (which continues to urge the clamp shells 380 together more tightly) and urges the extended crimp ring 331 forward. This advances the inner connector 314 forward in the main body 330 until the chamfer end surfaces 337 stop at the angled internal shoulders 334, where the inner connector is properly located for making an optical connection to other Optitap-compatible equipment. If the front end of the cable clamp insert 316 is in proper contact with the back face of the flange 333 of the extended crimp ring 331, the cable clamp retainer 390 will threadably advance to its forward-most position to seat the chamfer end surfaces 337 against the angled internal shoulders 334. And when the cable clamp insert 316 is not installed properly and there is space between the front end of the cable clamp insert 316 and the back face of the flange 333, the cable clamp retainer 390 will still press the chamfer end surfaces 337 against the angled internal shoulders 334, only the cable clamp retainer itself will be located at a slightly more rearward position. In this way, the connector 310 will still ensure that the inner connector 314 is properly positioned even when the cable clamp insert 316 is not installed on the extended crimp ring 331 at precisely the right position.

Figure 50:
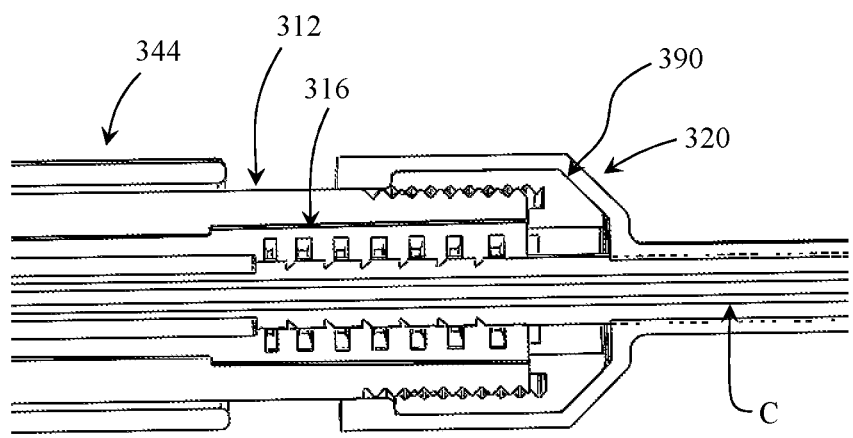
FIG. 50 is an enlarged fragmentary cross section of the fiber optic connector of FIG. 34 terminating the drop cable.
Figure 51:
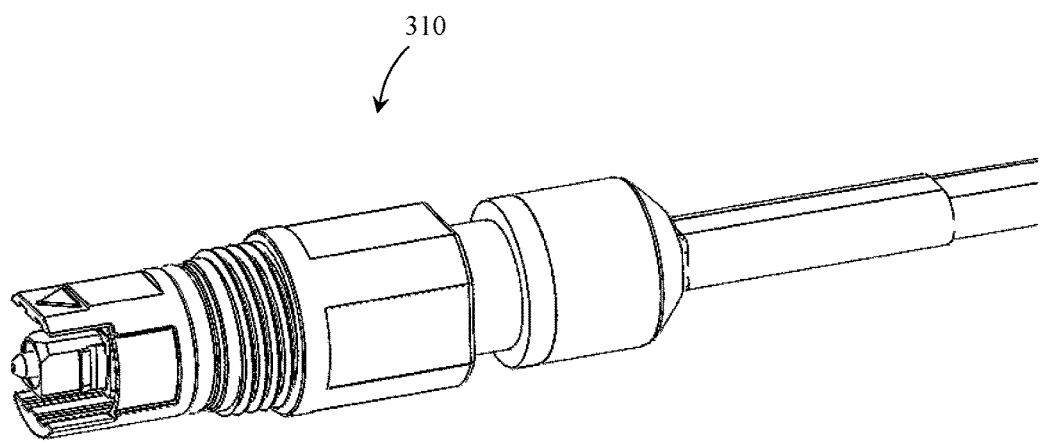
FIG. 51 is a perspective of the fiber optic connector of FIG. 34 terminating the drop cable.

Referring to FIGS. 50-51, after installing the cable clamp retainer 390 on the main body 330, the heat shrink tube 320 is installed. In one or more embodiments, the heat shrink tube 320 is internally lined with adhesive. The front end portion of the heat shrink tube 320 is slid over the cable clamp retainer 390. The rear end portion of the heat shrink tube 320 remains located on the cable C. Heat is then applied to shrink the heat shrink tube 120 and make a seal of the interface between the outer housing 312 and the cable C.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A fiber optic connector for terminating a drop cable, the fiber optic connector comprising:
a housing including a back post, the housing being configured for the drop cable to enter the housing through the back post;
a cable clamp insert configured to be at least partially received in the back post, the cable clamp insert defining a passage for receiving the drop cable; and
a crimp ring configured to be crimped onto the back post whereby the crimp ring secures the cable clamp insert to the housing and clamps the cable clamp insert onto the drop cable,
wherein the cable clamp insert comprises a cable grip portion configured to extend out of the back post, the cable grip portion defines gripping teeth in the passage, each gripping tooth is an elongate gripping tooth having a first end and a second end spaced apart along a longitudinal axis of the fiber optic connector, the first end and the second end of each gripping tooth having an undercut.

2. The fiber optic connector of claim 1, wherein the cable clamp insert comprises an insert portion configured to be received in the back post, and the cable grip portion is configured to be crushed by the crimp ring onto the drop cable.

3. The fiber optic connector of claim 1, wherein the passage is sized and shaped to accommodate the drop cable.

4. The fiber optic connector of claim 1, wherein the back post and the cable clamp insert comprise complementary keying features configured to circumferentially align the cable clamp insert with the back post.

5. The fiber optic connector of claim 4, wherein the keying feature of the back post comprises an internal keyway and the keying feature of the cable clamp insert comprises an external rib.

6. The fiber optic connector of claim 5, wherein the keying feature of the back post comprises an external keyway and the keying feature of the cable clamp insert comprises a forwardly projecting tab.

7. The fiber optic connector of claim 1, wherein the housing comprises a front body and a back body configured to couple to the front body, the back body defining the back post.

8. The fiber optic connector of claim 7, further comprising an inner connector received in the housing.

9. The fiber optic connector of claim 8, wherein the front body defines an internal stop, the inner connector defines an external stop, and the back body is configured to press the inner connector forward in the housing to engage the external stop with the internal stop and thereby hold the inner connector in the housing.

10. A fiber optic connector for terminating a drop cable, the fiber optic connector comprising:
a housing including a back post, the housing being configured for the drop cable to enter the housing through the back post;
a cable clamp insert configured to be at least partially received in the back post, the cable clamp insert defining a passage for receiving the drop cable; and
a crimp ring configured to be crimped onto the back post whereby the crimp ring secures the cable clamp insert to the housing and clamps the cable clamp insert onto the drop cable,
wherein the cable clamp insert comprises crush recesses spaced apart along an imaginary line on opposite sides of the passage, the cable clamp insert having a first section on one side of the imaginary line and a second section on another side of the imaginary line.

11. The fiber optic connector of claim 10, wherein the crush recesses configure the cable clamp insert so that the first and second sections deflect toward one another in directions generally perpendicular to the imaginary line when the crimp ring is crimped.

* * * * *